US012787041B2

(12) United States Patent
Khalid

(10) Patent No.: US 12,787,041 B2
(45) Date of Patent: Nov. 3, 2026

(54) METHODS AND APPARATUS FOR SUPPORTING SIDELINK COMMUNICATION BETWEEN DEVICES WHEN AT LEAST ONE OF THE DEVICES IS IN A NETWORK COVERAGE AREA

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 305 days.

(21) Appl. No.: 18/388,152

(22) Filed: Nov. 8, 2023

(65) Prior Publication Data

US 2025/0151094 A1 May 8, 2025

(51) Int. Cl.
*H04W 72/40* (2023.01)
*H04W 72/21* (2023.01)

(52) U.S. Cl.
CPC ........... *H04W 72/40* (2023.01); *H04W 72/21* (2023.01)

(58) Field of Classification Search
CPC ... H04W 72/40; H04W 72/21; H04W 72/541; H04W 72/20
See application file for complete search history.

(56) References Cited

U.S. PATENT DOCUMENTS

2021/0400704 A1* 12/2021 Xue ...................... H04L 5/0091
2022/0394659 A1* 12/2022 Vassilovski ............. H04W 8/24
2023/0309123 A1* 9/2023 Farag .................... H04L 5/0051
2024/0188153 A1* 6/2024 Hoang .................. G01S 5/0072
2025/0227470 A1* 7/2025 Zhang ................... H04L 5/0048
2025/0234361 A1* 7/2025 Wirth .................. H04W 74/002
2026/0012967 A1* 1/2026 Haustein ............... H04W 72/40

* cited by examiner

*Primary Examiner* — Gary Mui
*Assistant Examiner* — Yewon Kim
(74) *Attorney, Agent, or Firm* — Straub & Straub; Michael P. Straub; Stephen T. Straub

(57) ABSTRACT

Efficient sidelink communications between devices, e.g., user equipment (UE) devices, is supported when at least one of the user devices is within a network coverage area. Various embodiments are well suited for use in a communications system including a network of CBRS base stations. A core network implements a sidelink control component (CNSCC), working in conjunction with a spectrum access system (SAS) and/or an interference management module. The CNSCC manages the allocation of air link resources, e.g., PAL channels and/or GAA channels, to UEs to support efficient sidelink device to device communications while limiting interference levels and/or increasing throughput in the communications system. In some embodiments the allocation of a channel to UEs for sidelink communications is based on one more or all of: i) the current location of the UEs, ii) the current usage of spectrum in the system, and/or iii) the current levels of interference in the system.

20 Claims, 23 Drawing Sheets

METHODS AND APPARATUS FOR SUPPORTING SIDELINK COMMUNICATION BETWEEN DEVICES WHEN AT LEAST ONE OF THE DEVICES IS IN A NETWORK COVERAGE AREA

FIELD

The present application relates to wireless communications systems and more particularly to methods and apparatus for supporting efficient sidelink communications between devices, e.g., user equipment (UE) devices.

BACKGROUND

Sidelink communication allows UEs or end user devices to communicate with each other. This sidelink communication can take place while the UEs are within a mobile network's coverage, while the UEs are in a partial network coverage area, i.e., some of the UEs are within a network coverage area while other UEs are not, or while all of the UEs are completely out of the network coverage area.

In Citizens Broadband Radio Services (CBRS) sidelink communication may require some special provisions for this technology to work legally. This is due to the fact that CBRS may require a CBRS base station transmitter to register with an SAS prior to being allowed to transmit at high power.

UEs requiring sidelink communications using CBRS spectrum are exempted from obtaining registration before transmission under some conditions. UEs transmitting at power levels below 23 dBm technically don't need permission to transmit within the Priority Access License (PAL) or General Authorized Access (GAA) that the operator is allowed to transmit on. This approach is not ideal as the network has to provide dedicated radio resources for this transmission. For high powered UEs transmitting above such power levels, such as some fixed wireless devices, the UEs must also be registered for sidelink communications using CBRS spectrum.

Dedicated resource allocation can result in network resources getting tied up. Devices using dedicated resources can face interference from sidelink communications.

Based on the above discussion, it should be appreciated that there is a need for new methods and apparatus to support sidelink communications It would be advantages if at least some of these new methods and apparatus facilitated efficient sidelink communications between UEs, increased data rates and/or data throughput for sidelink communications, reduced levels of interference in the network and/or improved communication efficiency.

SUMMARY

Methods and apparatus for supporting efficient sidelink communications between devices, e.g., user equipment (UE) devices, when at least one of the user devices is within a network coverage area are described. Various embodiments, in accordance with the present invention are well suited for use in a communications system including a network of CBRS base stations. A core network implements a core network sidelink control component (CNSCC), working in conjunction with a spectrum access system (SAS) and/or an interference management module. The CNSCC manages the allocation of air link resources, e.g., PAL channels and/or GAA channels, to UEs to support efficient sidelink device to device communications while limiting interference levels and/or increasing throughput in the communications system.

The allocation, e.g., temporary allocation, of a channel to UEs for sidelink communications is based on the current location of the UEs, the current usage of spectrum in the system, and/or the current levels of interference in the system. In some embodiments, a UE requesting air link resources for sidelink device to device communications may be, and sometimes is, granted a clean channel, e.g., a clean PAL or clean GAA channel, for its use to support high quality communications, when such as channel is available at the local area in which the device to device communications are to occur. If such a clean channel is not available, the requesting UE may be, and sometimes is, granted use of an identified cleanest available channel, based on system interference information, for use to support limited low quality sidelink device to device communications, e.g., at reduced power levels and/or reduce data rates. In various embodiments, the granting of a channel for UE sidelink device to device communications by the CNSCC, allows the UEs to perform efficient sidelink communications without requiring listen-before talk (LBT) operations thus reducing overhead signaling.

An exemplary communications method, in accordance with some embodiments, comprises receiving, at a base station, e.g., a CBRS base station, a sidelink request from a first UE for device to device communication between the first UE and a second UE; sending, from the base station, a sidelink possibility inquiry message including information identifying the first and second UEs to a core network sidelink control component (CNSCC); receiving, at the base station, a sidelink possibility response message from the CNSCC; generating a sidelink request response message based on information included in said sidelink possibility response message; and sending, from the base station, the sidelink request response message to the first UE.

While various features are discussed in the above summary, all features discussed above need not be supported in all embodiments and numerous variations are possible. Numerous additional features, details and embodiments are described in the detailed description below.

DETAILED DESCRIPTION

Figure 1:
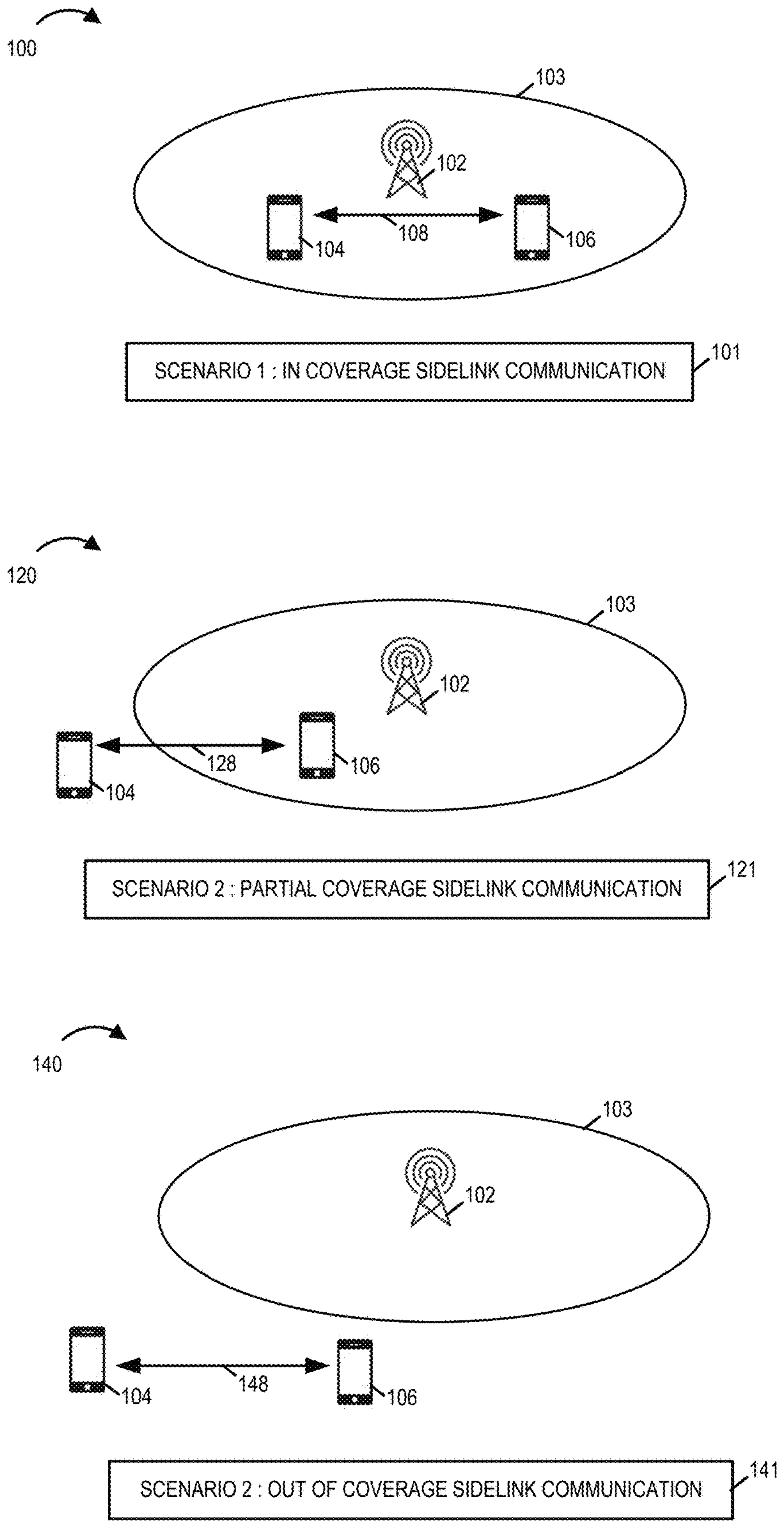
FIG. 1 illustrates three exemplary scenarios with regard to sidelink communications.

FIG. 1 illustrates three exemplary scenarios with regard to sidelink communications. Drawing 100 of FIG. 1 illustrates scenario 1, which is an in coverage sidelink communication, as indicated by title box 101. In scenario 1 first UE 104 and second UE 106 are within network coverage area 103 of base station 102, and the first UE 104 and second UE 106 communicate sidelink communications signals 108. Drawing 120 of FIG. 1 illustrates scenario 2, which is a partial coverage sidelink communication, as indicated by title box 121. In scenario 2, first UE 104 is outside network coverage area 103 of base station 102; second UE 106 is within network coverage area 103 of base station 102; and the first UE 104 and second UE 106 communicate sidelink communications signals 128. Drawing 140 of FIG. 1 illustrates scenario 3, which is an out of coverage sidelink communication, as indicated by title box 141. In scenario 3, the first UE 104 and the second UE 106 are both outside the network coverage area 103 of base station 102, and the first UE 104 and second UE 106 communicate sidelink communications signals 148.

When a UE is under a network's coverage, the UE can be, and sometimes is, under the network's supervision with regard to sidelink communications. This allows for the network to allocate frequency resources for sidelink communications to end user devices. In scenario 1 and scenario 2, the network can, and sometimes does, allocate resources for sidelink communications to at least one of the UEs. This approach allows the network to assert/control communication such as frequency and timing of the communication. However, in scenario 3, there is no network control, and the network will not be able to provide control information to the UEs.

Various embodiments, in accordance with the present invention, are directed to scenario 1 and/or scenario 2. In some such embodiments, the CBRS network may, and sometimes does, allow UEs to communicate with each other on a channel that is not in use by the network. In various embodiments, the network performs operations to ensure that the UEs use a channel, for their sidelink communication, which is not in use by other providers/radio network devices or end users, when such a channel is available. In some embodiments, the network performs operations to allow UEs to use a channel, which is sparsely in use, for limited low quality sidelink communication, when a clean channel in not available.

Figure 2:
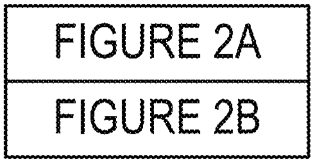
FIG. 2 comprises the combination of FIG. 2A and FIG. 2B.
Figure 2A:
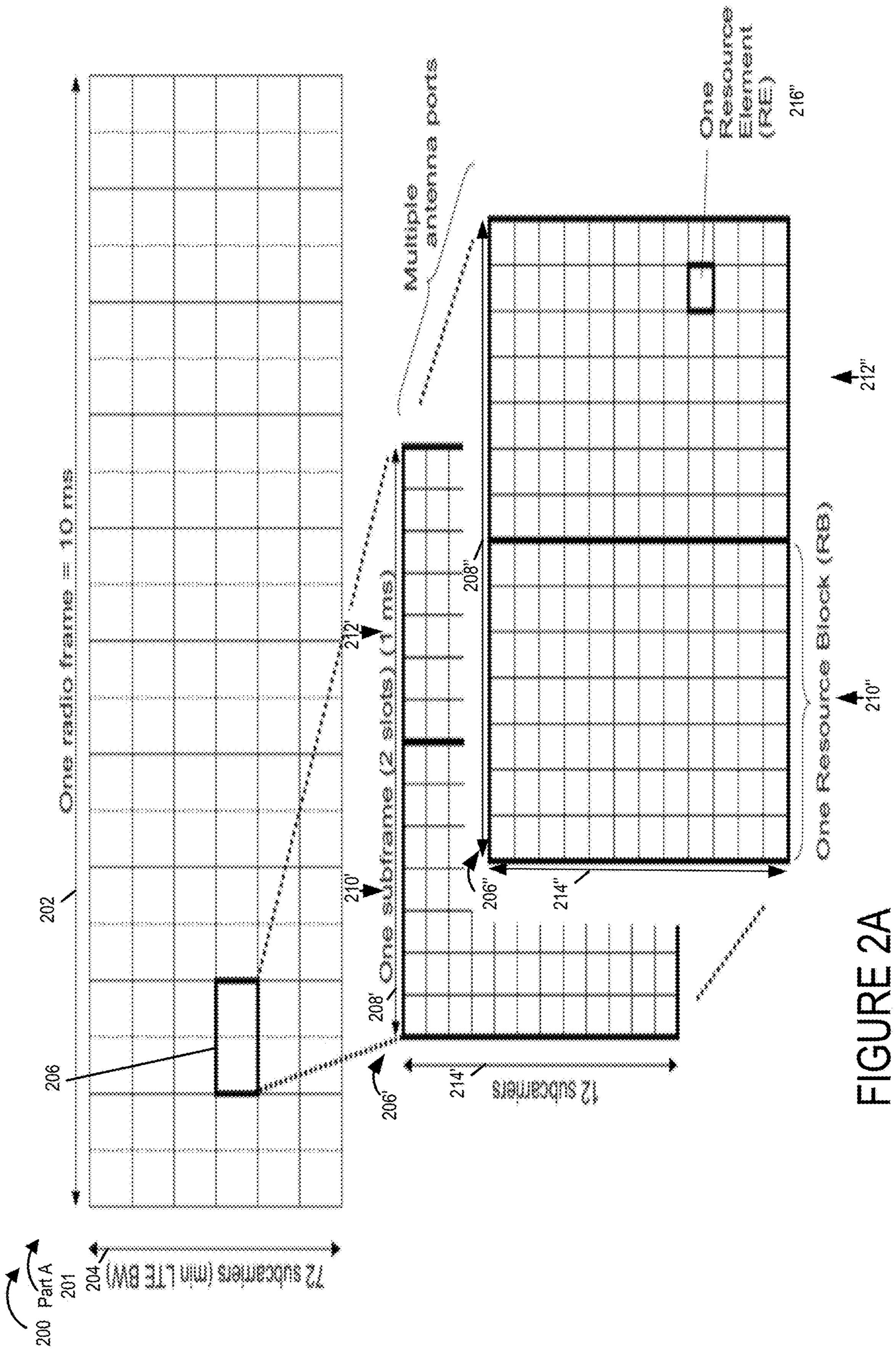
FIG. 2A is a first part of a drawing which illustrates an exemplary frequency-time resource grid of a typical Long Term Evolution (LTE) network.
Figure 2B:
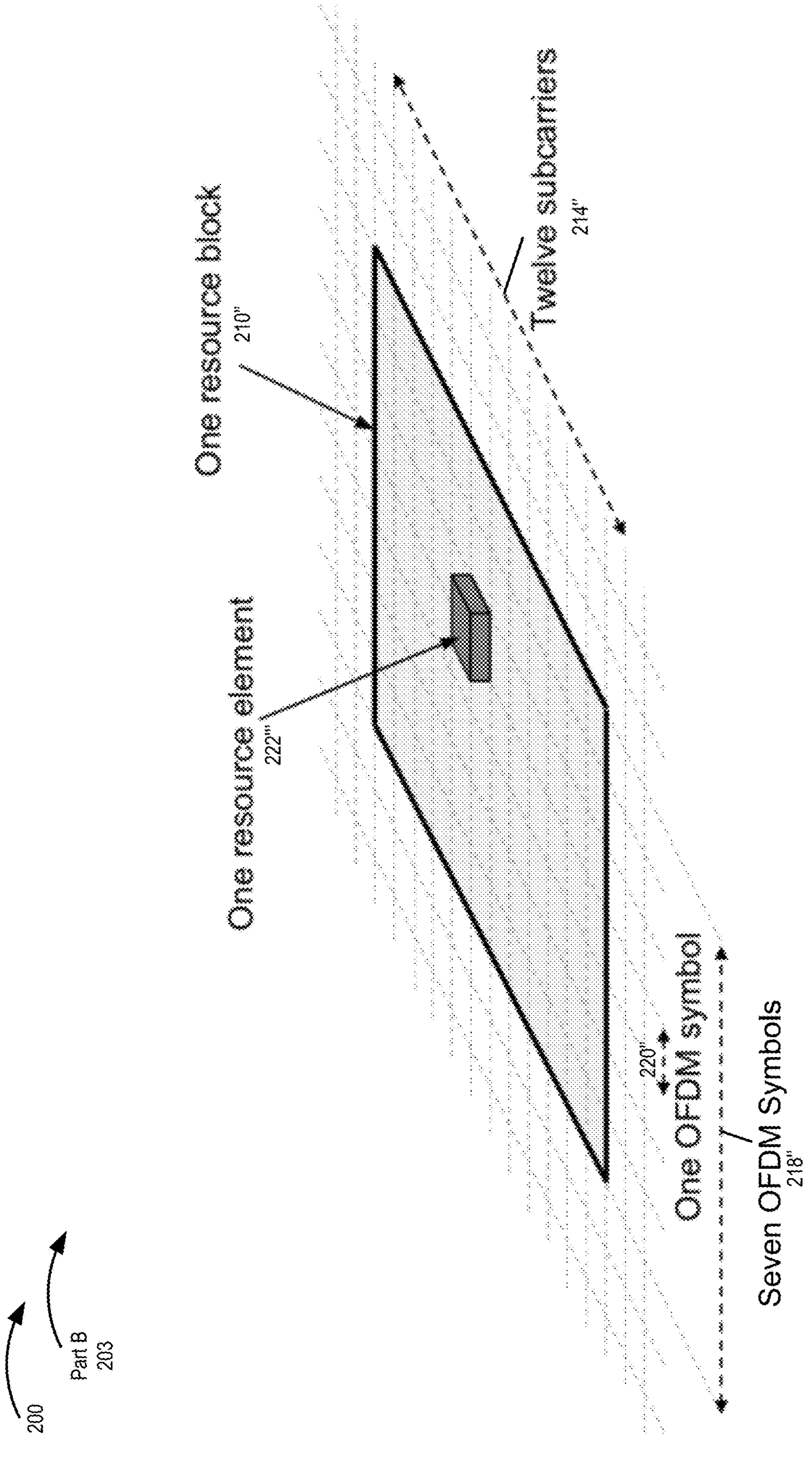
FIG. 2B is a second part of a drawing which illustrates an exemplary frequency-time resource grid of a typical Long Term Evolution (LTE) network.

FIG. 2, comprising the combination of FIG. 2A and FIG. 2B, is a drawing 200 including Part A 201 and Part B 203, which illustrates an exemplary frequency-time resource grid of a typical Long Term Evolution (LTE) network. Note that the same concept applies to Fifth Generation New Radio (5G NR) as well. In Part A 201, frequency range 204 corresponds to 72 subcarriers, which is a minimum LTE bandwidth (BW). Time 202 corresponds to one radio frame which has a duration of 10 ms. Exemplary frequency time resource unit 206 corresponds to a frequency block of 12 subcarriers and one 1 ms subframe. Each 1 ms subframe includes 2 slots. Each slot corresponds to seven OFDM symbols. One resource block (RB) corresponds to 12 subcarriers and 1 slot.

Exemplary frequency time resource unit 206 in the overall frequency timing structure corresponds to multiple instances (206', . . . , 206') in the case of multiple antenna ports. For example, frequency time resource unit 206', which corresponds to antenna port 1, has frequency range 214' corresponding to 12 subcarriers and includes 1 ms 2 slot subframe 208'. Frequency time resource unit 206' includes resource block (RB) 210' and RB 212'. Similarly, frequency time resource unit 206", which corresponds to antenna port N, has frequency range 214" corresponding to 12 subcarriers and includes 1 ms 2 slot subframe 208". Frequency time resource unit 206" includes RB 210" and RB 212".

Within each resource block (210', 212', . . . , 210", 212") there are 84 resource elements (REs). For example, RE 216" is one of the 84 REs of RB212".

FIG. 2B illustrates exemplary resource block (RB) 210" which corresponds to a frequency range of twelve subcarriers 214" and a time range of seven OFDM symbols 218". One exemplary OFDM symbol 220" is identified, and one exemplary resource element (RE) 222" identified.

When an eNodeB(s) (or gNB(s)) is transmitting or receiving data, resource elements within resource blocks are dedicated for communication. If a network were to allow UEs to communicate with each other, these resources will be taken up, i.e., all other UEs and eNodeB (or gNB) will not be scheduling data for transmission during the time UEs are talking to each other.

One way that UEs can communicate with each other without having to use the frequency resources (under network's use) is using GAA channels. These channels must not be in use in that area or must be sparsely in use by other operators/devices. Various embodiments and/or features of one or more embodiments, are directed to each of the cases.

When both of the UEs, which seek to engage in sidelink device to device communications, are under the coverage of the network, it is easy for the network to choose one or both of the UEs.

Figure 3:
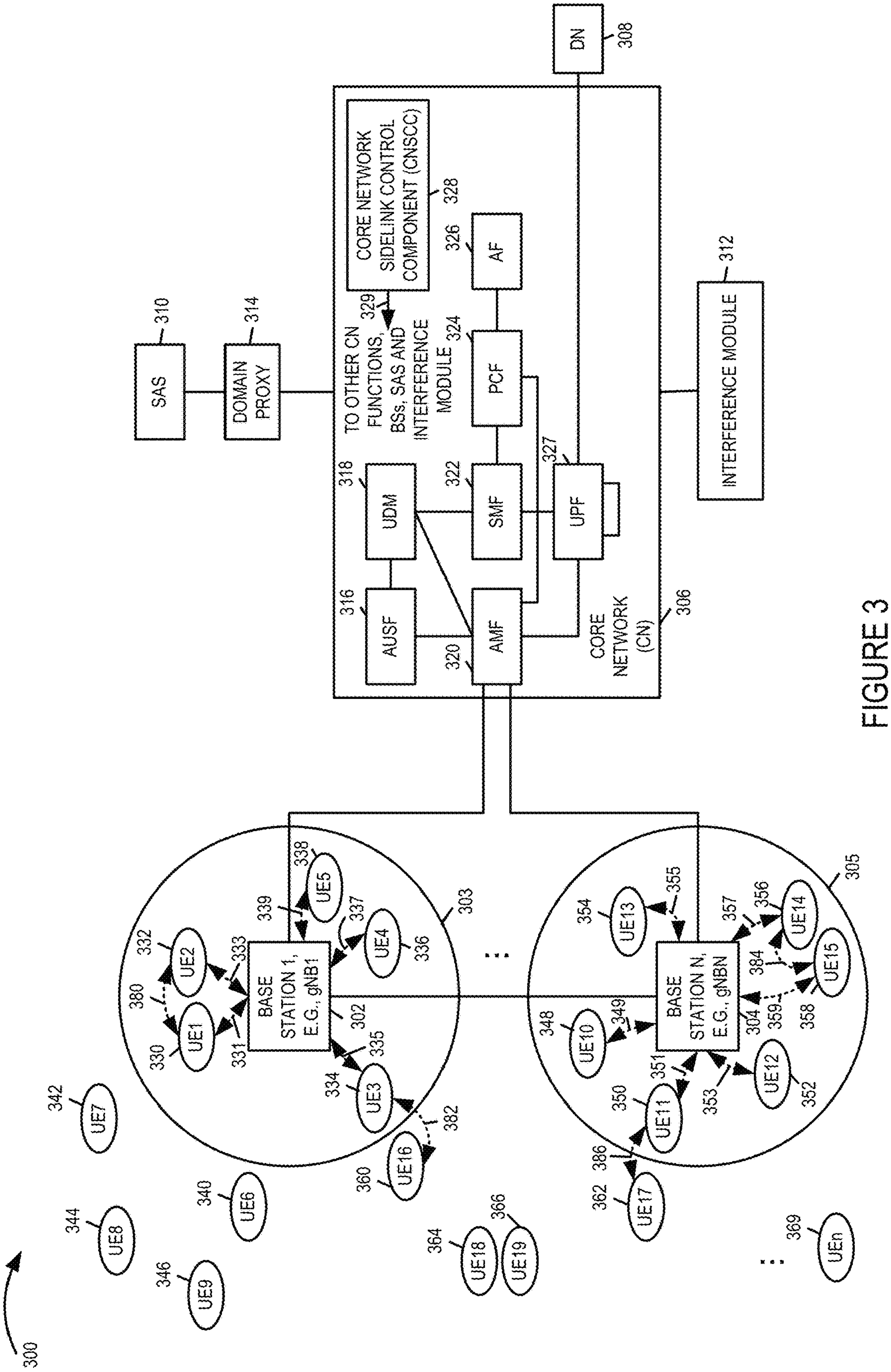
FIG. 3 is a drawing of an exemplary communications system in accordance with an exemplary embodiment.

FIG. 3 is a drawing of an exemplary communications system 300 in accordance with an exemplary embodiment. Exemplary communications system 300 includes a plurality of base station (base station 1 302, e.g., gNB1 which is a CBRS base station, . . . , base station N 304, e.g., gNBN, which is a CBRS base station), a core network (CN) 306, a Spectrum Access System (SAS) 310, a Domain Proxy 314, a Data Network (DN) 308 and an Interference module 312 coupled together as shown. Core network 306 includes authentication server function (AUSF) 316, unified data management (UDM) 318, access and mobility management function (AMF) 320, session management function (SMF) 322, policy and control function (PCF) 324, application function (AF) 326, and user plane function (UPF) 327 coupled together as shown. Core network 306 further includes core network sidelink control component (CNSCC) coupled via interface 329 to other CN functions, BSs (BS 1 302, . . . BS N 304), SAS 310, and interference module 312.

System 300 further includes a plurality of user equipments (UEs) (UE1 330, UE2 332, UE3 334, UE4 336, UE5 338, UE6 340, UE7 342, UE8 344, UE9 346, UE10 348, UE11 350, UE12 352, UE13 354, UE 14 356, UE15 358, UE16 360, UE17 362, UE18 364, UE19 366, . . . , UEn 369). At least some of the UEs are mobile devices which may move throughout the system.

Base station 1 302 has a corresponding wireless coverage area 303. Base station N 304 has a corresponding wireless coverage area 305. UEs (UE 1 330, UE2 332, UE 3 334, UE 4 336 and UE5 338) are shown located within wireless coverage area 303 corresponding to BS 1 302. UEs (UE10 348, UE 11 350, UE12 352, UE13 354, UE14 356 and UE15 358) are shown located within wireless coverage area 305 corresponding to BS 2 304. UEs (UE6 340, UE7 342, UE8 344, UE9 346, UE16 360, UE17 362, UE18 364, UE19 366 and UEn 369) are outside of the coverage areas (303, . . . , 305) of the base stations (302, . . . , 304).

UE1 330 is coupled to base station 1 302 via wireless communications link 331. UE2 332 is coupled to base station 1 302 via wireless communications link 333. UE3 334 is coupled to base station 1 302 via wireless communications link 335. UE4 336 is coupled to base station 1 302 via wireless communications link 337. UE5 338 is coupled to base station 1 302 via wireless communications link 339. UE1 330 and UE2 332 have an established sidelink communications link 380, via which device to device signals are communicated. UE3 334 and UE16 360 have an established sidelink communications link 382, via which device to device signals are communicated.

UE10 348 is coupled to base station 2 304 via wireless communications link 349. UE11 350 is coupled to base station 2 304 via wireless communications link 351. UE12 352 is coupled to base station 2 304 via wireless communications link 353. UE13 354 is coupled to base station 2 304 via wireless communications link 355. UE14 356 is coupled to base station 2 304 via wireless communications link 357. UE15 358 is coupled to base station 2 304 via wireless communications link 359. UE14 356 and UE15 358 have an established sidelink communications link 384, via which device to device signals are communicated. UE11 350 and UE17 362 have an established sidelink communications link 386, via which device to device signals are communicated.

FIG. 3 shows an exemplary generic architecture in accordance with various embodiments of the present invention. A typical 5G network comprises base stations, e.g., gNBs, (base station 1 302, e.g., gNB1, . . . , base station N 304, e.g., gNBN) and the core network 306. The core network 306 is coupled to the SAS 310 via Domain Proxy 314. The SAS 310, via Domain Proxy 314, helps the core network 306 on selecting the clean channels for sidelink communication. Interference module 312, e.g., a component or service, helps the core network 306 in ranking channels and identifying channels which can be used for in a limited fashion for sidelink communications, when a clean channel is not available to be used for sidelink communications.

Figure 4:
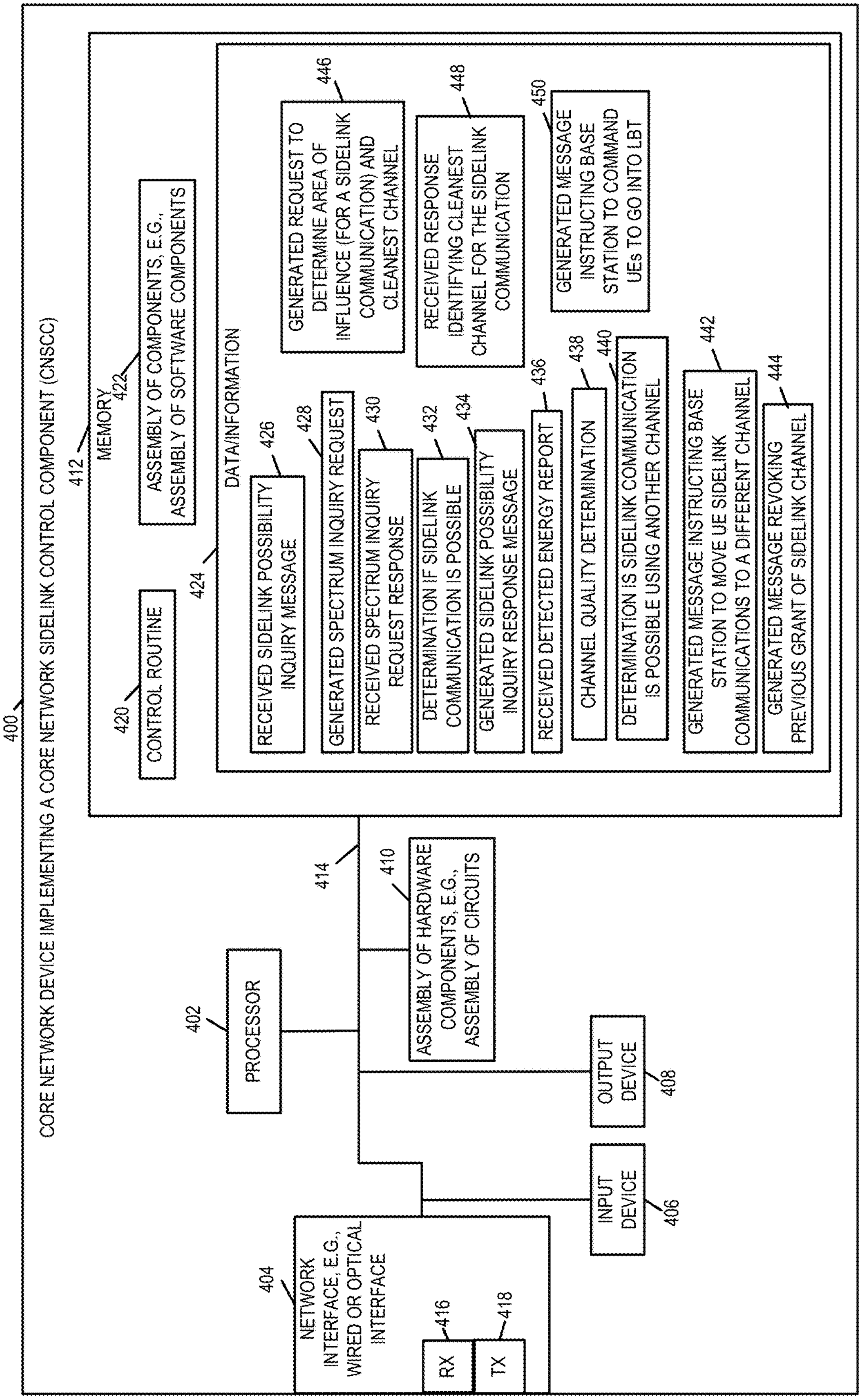
FIG. 4 is a drawing of an exemplary core network device implementing a core network sidelink control component (CNSCC) in accordance with an exemplary embodiment.

FIG. 4 is a drawing of an exemplary core network device 400 implementing a core network sidelink control component (CNSCC) in accordance with an exemplary embodiment. Core network device 400 is, e.g., core network sidelink control component (CNSCC) 328 of core network 306 of system 300 of FIG. 3, of FIG. 6 and/or of FIG. 7. Core network device 400 includes a processor 402, e.g., a CPU, a network interface 404, e.g., a wired or optical interface, an input device 406, e.g., a keyboard or mouse, an output device 410, e.g., a display, an assembly of hardware components 410, e.g., an assembly of circuits, and memory 412 coupled together via a bus 414 over which the various elements may interchange data and information.

Network interface 404 includes a receiver 416 and a transmitter 418. Memory 412 includes a control routine 420, an assembly of components 422, e.g., an assembly of software components, and data/information 424. Control routine 420 includes machine executable instructions, which when executed by processor 402 control the CNSCC 400 to perform basic operations including read to memory, write to memory, operate an interface, etc. Assembly of software components 422 includes machine executable instructions, which when executed by processor 402 control the CNSCC 400 to perform steps of an exemplary method in accordance with the present invention, e.g., steps of the method of signaling diagram 600 of FIG. 6 and/or steps of the signaling diagram 900 of FIG. 7, which are performed by CNSCC 328.

Data/information 424 includes a received sidelink possibility inquiry message 426, a generated spectrum inquiry request 428, a received spectrum inquiry request response 430, a determination if sidelink communication is possible 432, a generated sidelink possibility inquiry response message 434, a received detected energy report 436, a channel quality determination 438, a determination if sidelink communications is possible using another channel 440, a generated message instructing a base station to move UE sidelink communications to a different channel 442, a generated message revoking a previous grant of a sidelink channel 444, a generated request to determine an area of influence (for a sidelink communication between identified UEs) and determine the cleanest (e.g. quietest channel and/or channel which will be least negatively impacted by the allowing the sidelink communications) channel 446, a received response identifying a cleanest channel for the sidelink communication 448, and a generated message instructing a base station to command UEs to go into LBT mode with regard to sidelink communications 450.

Figure 5:
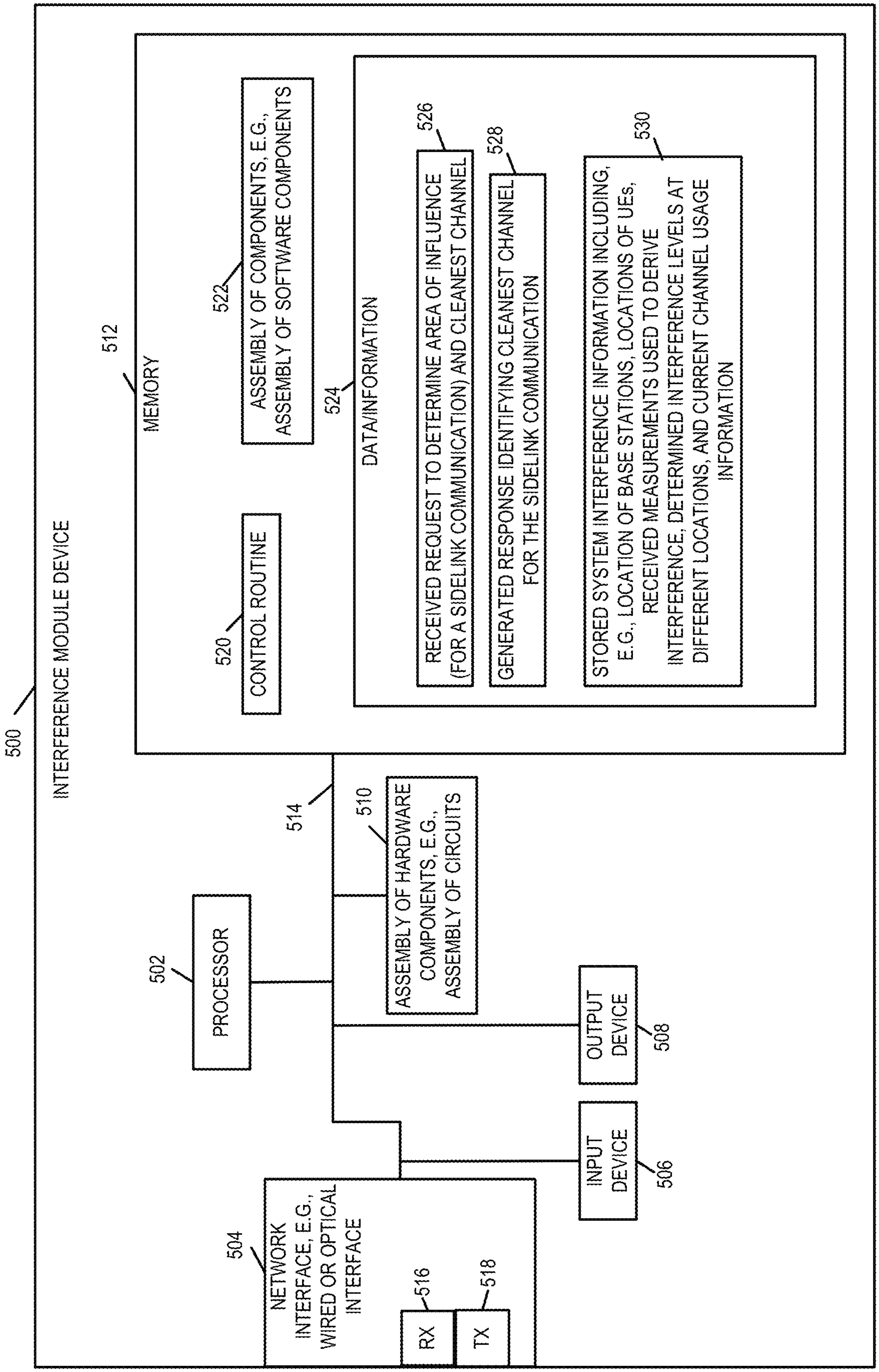
FIG. 5 is a drawing of an exemplary interference module device in accordance with an exemplary embodiment.

FIG. 5 is a drawing of an exemplary interference module device 500 in accordance with an exemplary embodiment. Interference module 500 is, e.g., interference module 312 of system 300 of FIG. 3 and/or of FIG. 7. Interference module device 500 includes a processor 502, e.g., a CPU, a network interface 504, e.g., a wired or optical interface, an input device 506, e.g., a keyboard or mouse, an output device 510, e.g., a display, an assembly of hardware components 510, e.g., an assembly of circuits, and memory 512 coupled together via a bus 514 over which the various elements may interchange data and information.

Network interface 504 includes a receiver 516 and a transmitter 518. Memory 512 includes a control routine 520, an assembly of components 522, e.g., an assembly of software components, and data/information 524. Control routine 520 includes machine executable instructions, which when executed by processor 502 control the interface module device 500 to perform basic operations including read to memory, write to memory, operate an interface, etc. Assembly of software components 522 includes machine executable instructions, which when executed by processor 502 control the interface module device 500 to perform steps of an exemplary method in accordance with the present invention, e.g., steps of the signaling diagram 900 of FIG. 7, which are performed by interference module 312.

Data/information 524 includes a received request to determine an area of influence (for a potential sidelink communication) and determine a cleanest channel 526, a generated response identifying the cleanest channel for the sidelink communication 528, and stored system interference information 530 including, e.g., locations of base stations, locations of UEs, received measurements used to derive interference, reported measured interference, determined interference levels corresponding to different spectrum, e.g. different channels, at different locations, and current channel usage information.

Various embodiments are directed to providing sidelink communications, on a channel, e.g., a GAA channel, between two UEs that are either both in-network coverage or at least one of the UEs is in coverage of the network, e.g., a partial network coverage scenario.

Figure 6:
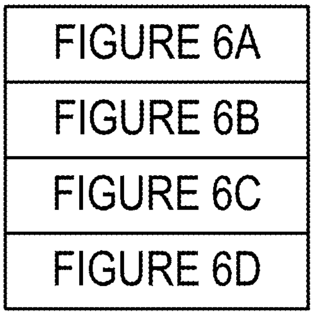
FIG. 6 comprises the combination of FIG. 6A, FIG. 6B, FIG. 6C and FIG. 6D.
Figure 6A:
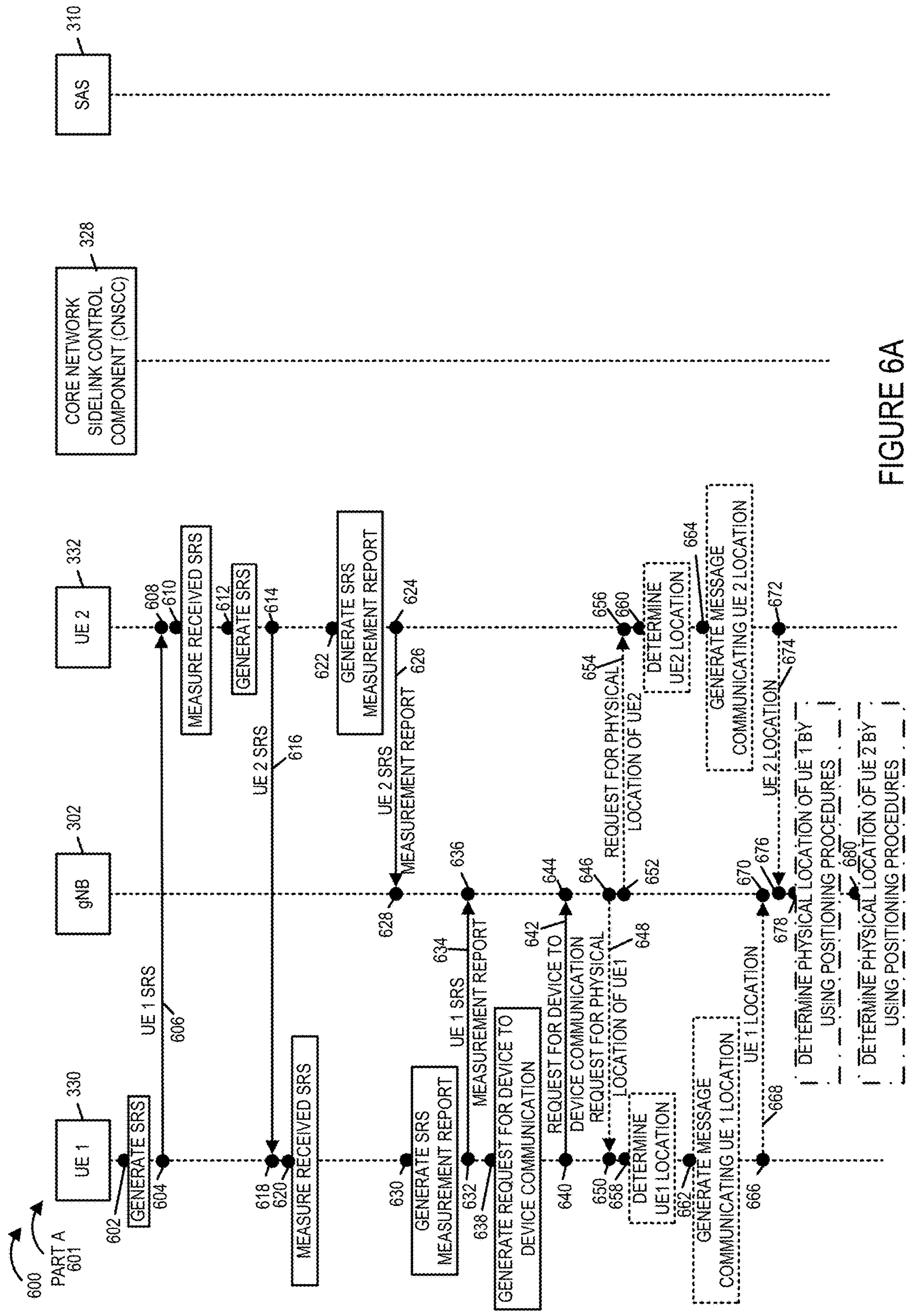
FIG. 6A is a first part of an exemplary signaling diagram illustrating exemplary steps and messaging of an exemplary method of supporting efficient device to device sidelink communications between UEs under the control of a core network operating in conjunction with a spectrum access system (SAS) in accordance with an exemplary embodiment.
Figure 6B:
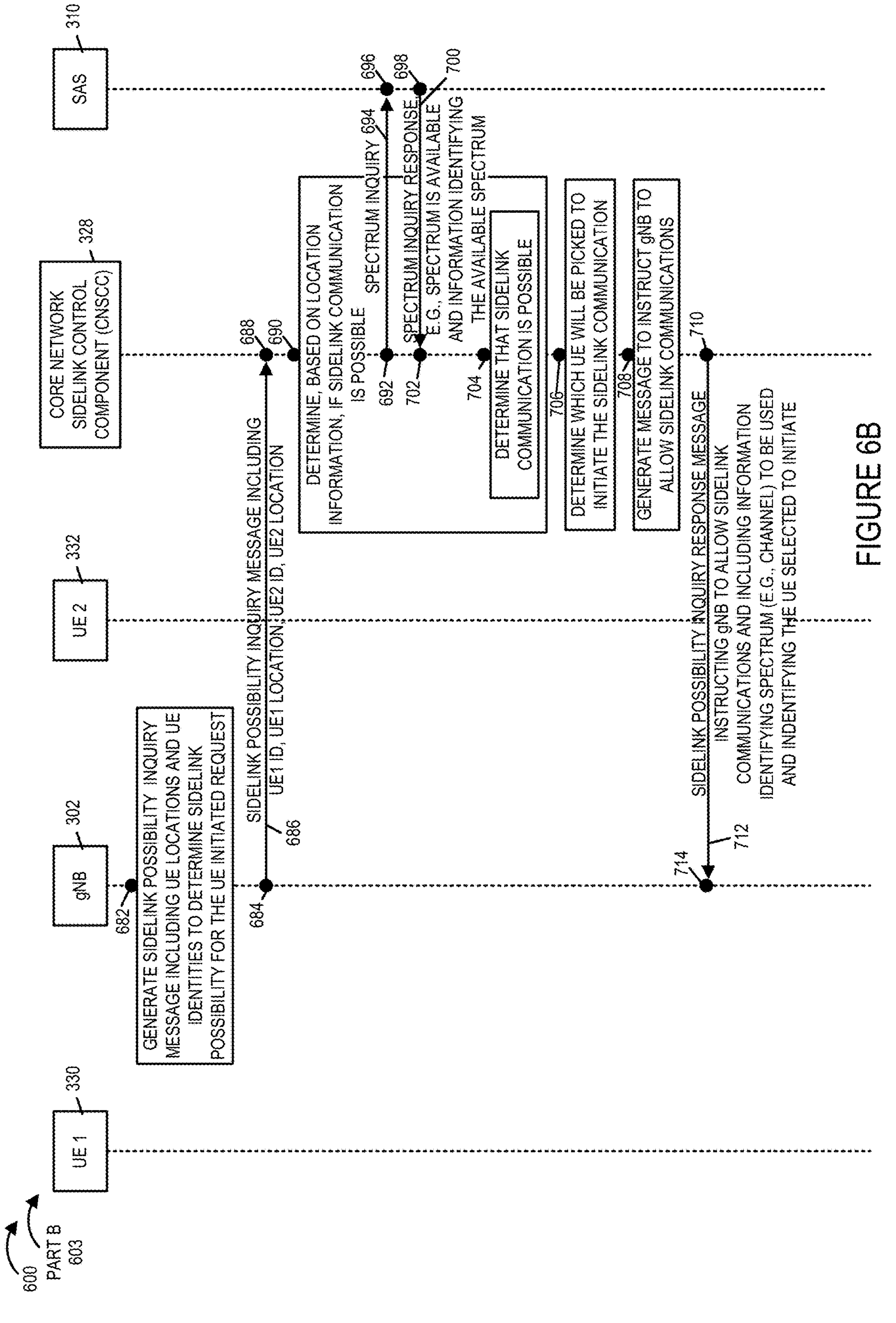
FIG. 6B is a second part of an exemplary signaling diagram illustrating exemplary steps and messaging of an exemplary method of supporting efficient device to device sidelink communications between UEs under the control of a core network operating in conjunction with a spectrum access system (SAS) in accordance with an exemplary embodiment.
Figure 6C:
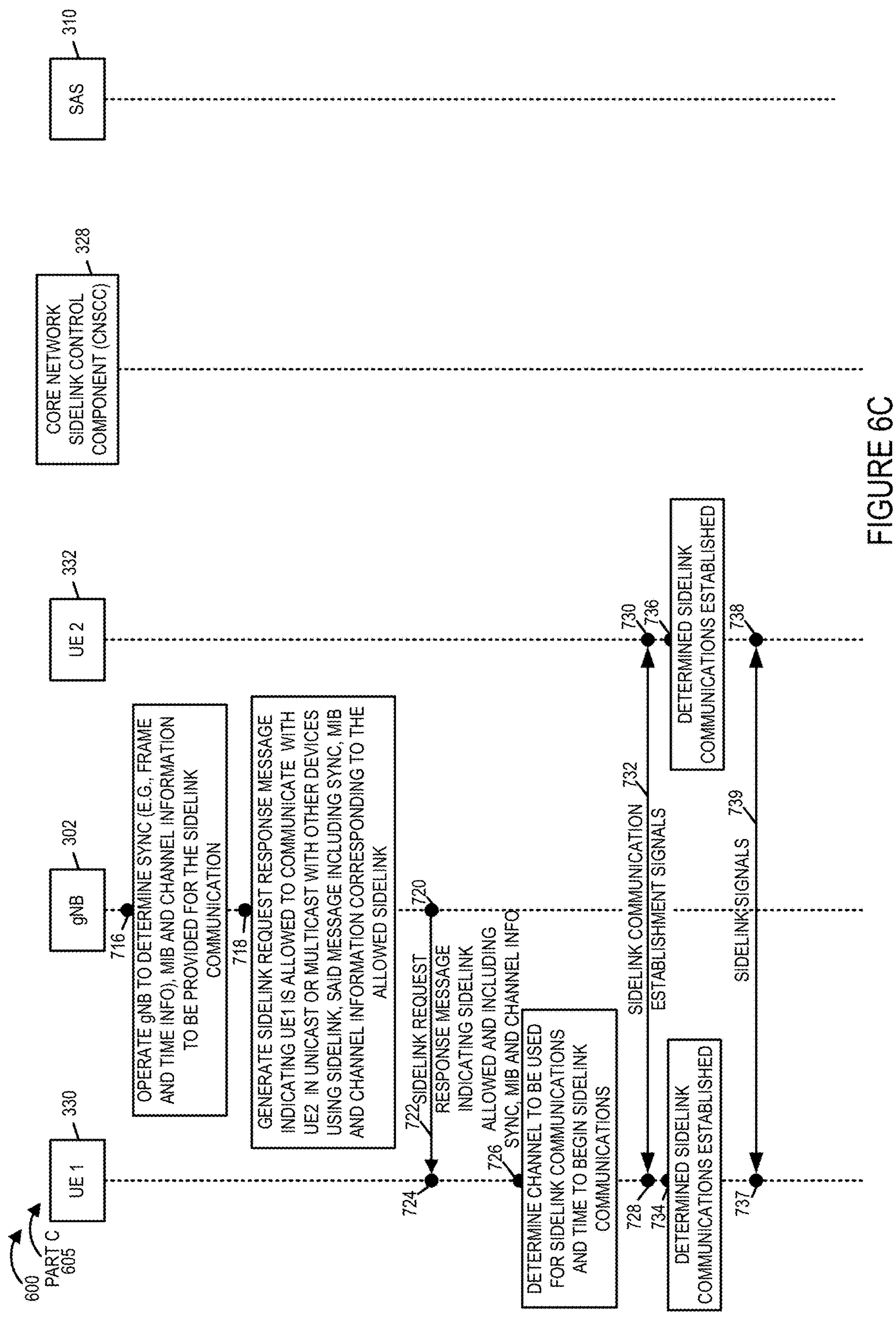
FIG. 6C is a third part of an exemplary signaling diagram illustrating exemplary steps and messaging of an exemplary method of supporting efficient device to device sidelink communications between UEs under the control of a core network operating in conjunction with a spectrum access system (SAS) in accordance with an exemplary embodiment.
Figure 6D:
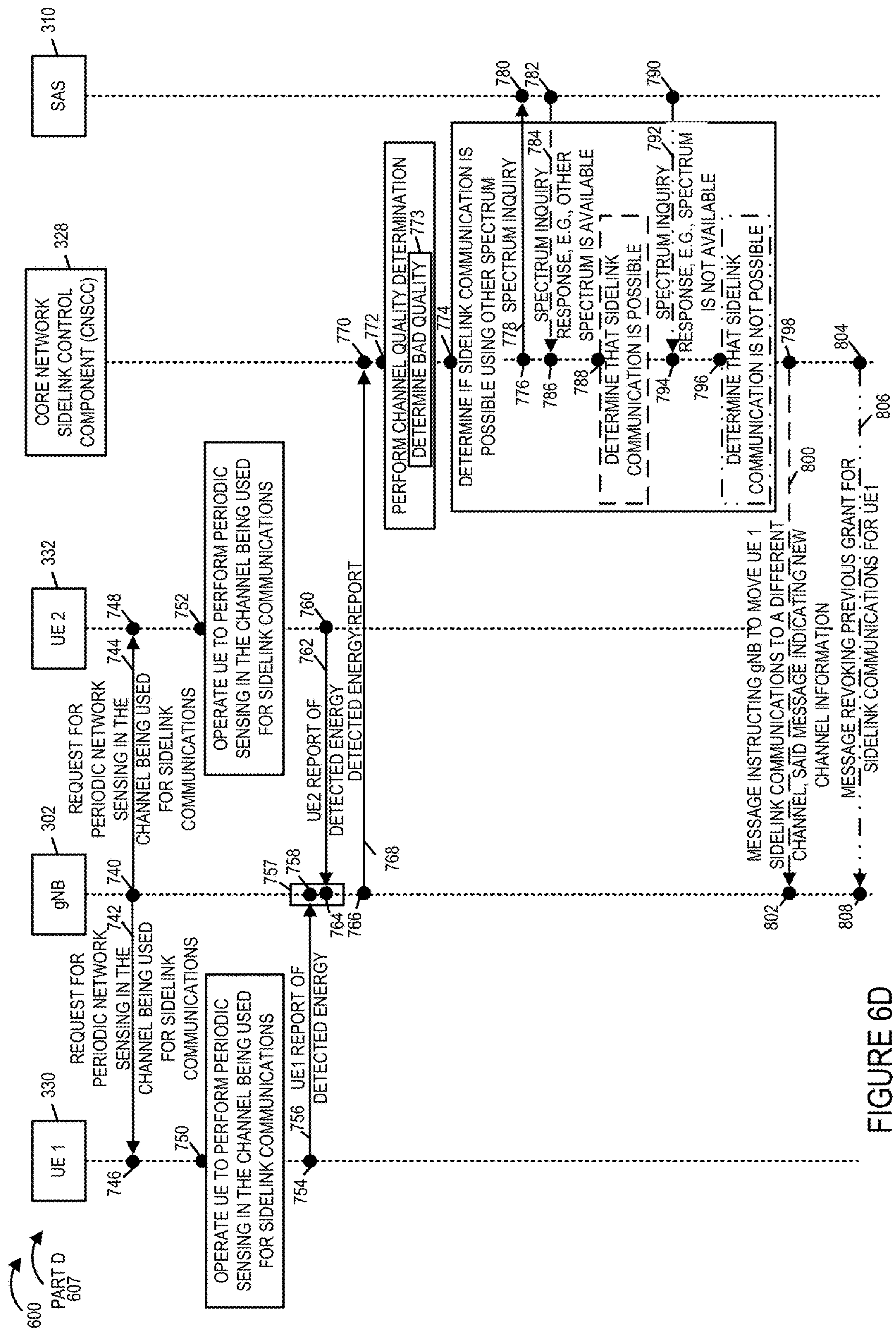
FIG. 6D is a fourth part of an exemplary signaling diagram illustrating exemplary steps and messaging of an exemplary method of supporting efficient device to device sidelink communications between UEs under the control of a core network operating in conjunction with a spectrum access system (SAS) in accordance with an exemplary embodiment.
Figure 7:
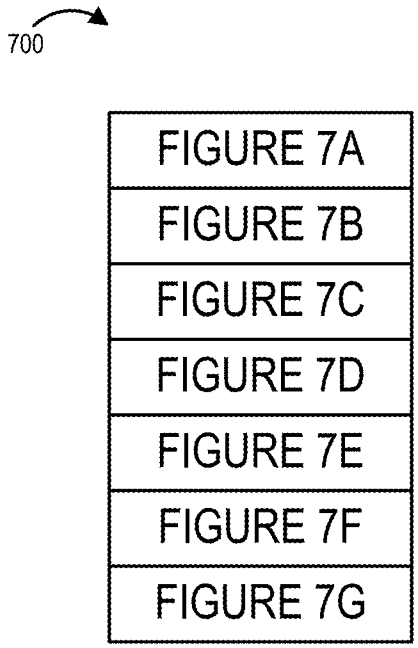
FIG. 7 is a diagram 700 comprising the combination of FIG. 7A, FIG. 7B, FIG. 7C, FIG. 7D, FIG. 7E, FIG. 7F and FIG. 7G which can be combined as shown to form a single diagram.
Figure 7A:
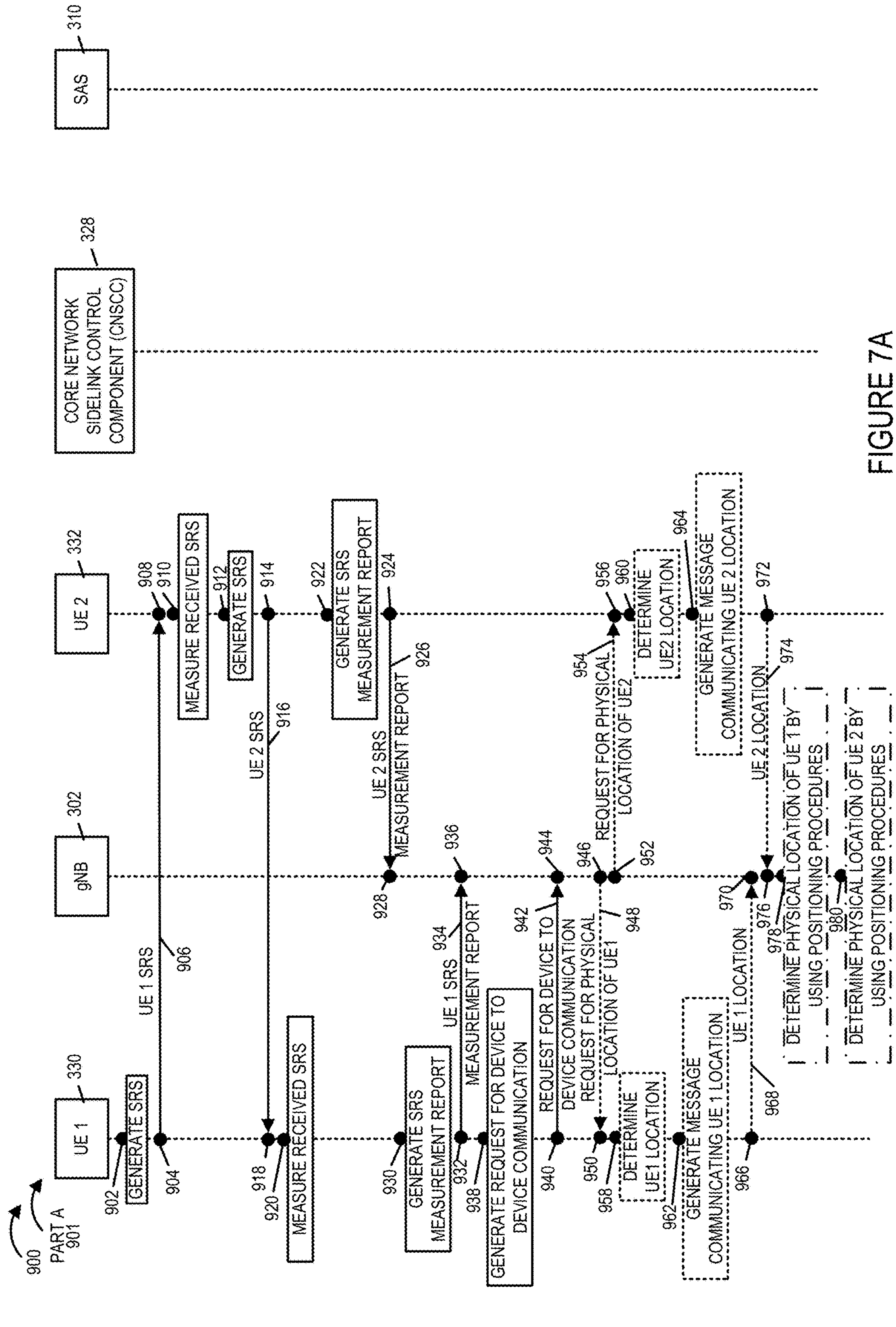
FIG. 7A is a first part of an exemplary signaling diagram illustrating exemplary steps and messaging of an exemplary method of supporting efficient device to device sidelink communications between UEs under the control of a core network operating in conjunction with a spectrum access system (SAS) and an interference module in accordance with an exemplary embodiment.
Figure 7B:
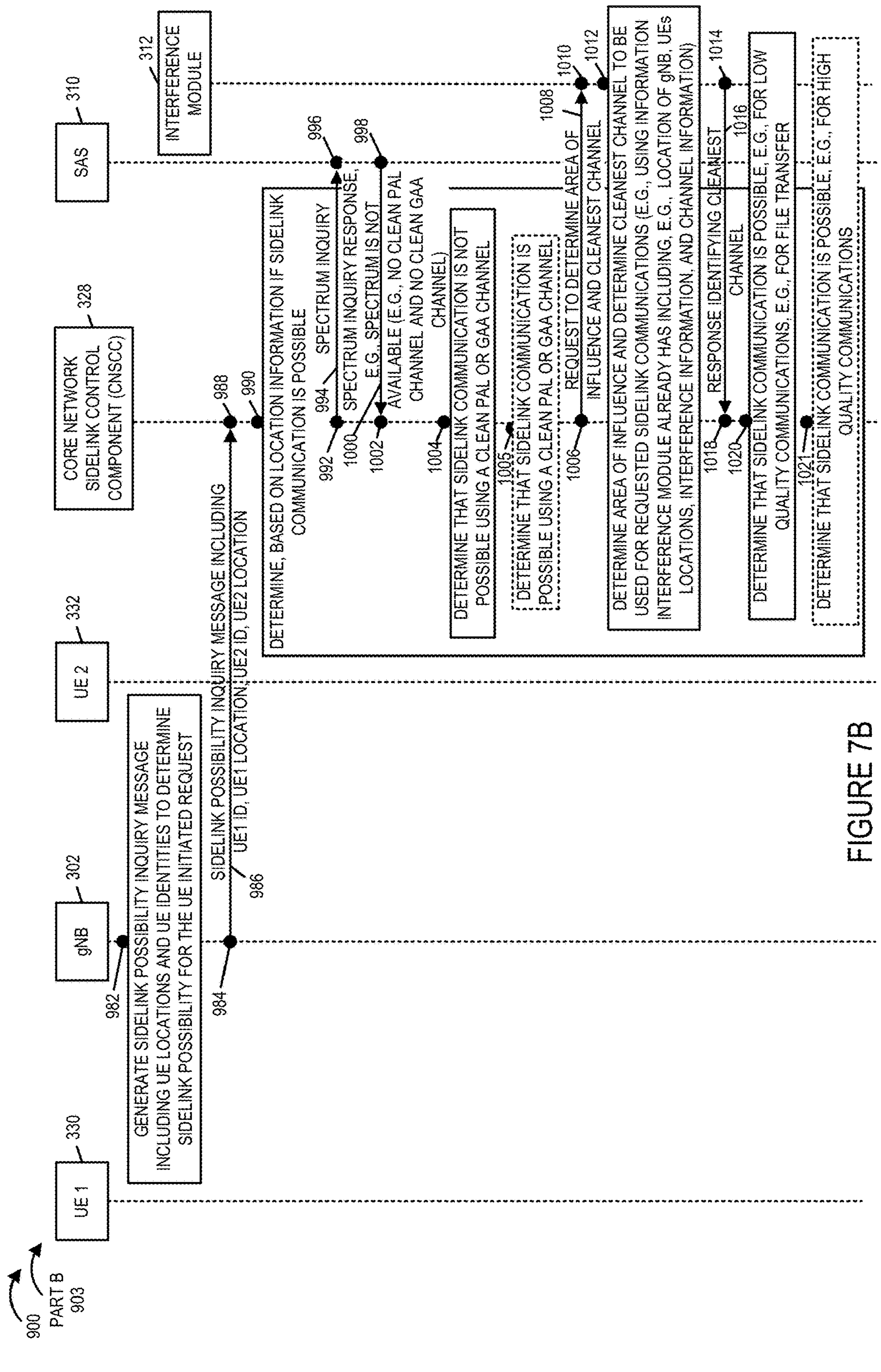
FIG. 7B is a second part of an exemplary signaling diagram illustrating exemplary steps and messaging of an exemplary method of supporting efficient device to device sidelink communications between UEs under the control of a core network operating in conjunction with a spectrum access system (SAS) and an interference module in accordance with an exemplary embodiment.
Figure 7C:
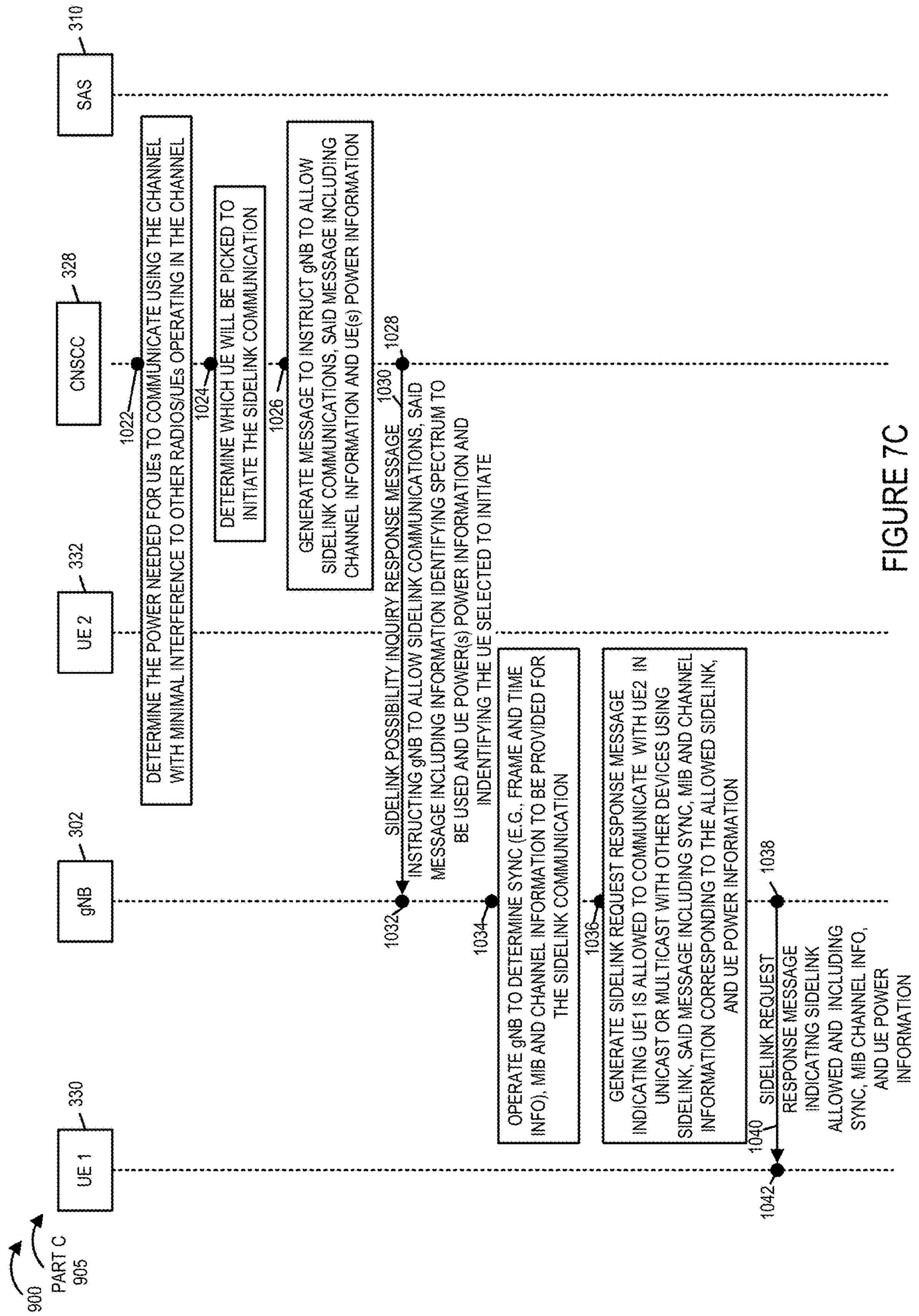
FIG. 7C is a third part of an exemplary signaling diagram illustrating exemplary steps and messaging of an exemplary method of supporting efficient device to device sidelink communications between UEs under the control of a core network operating in conjunction with a spectrum access system (SAS) and an interference module in accordance with an exemplary embodiment.
Figure 7D:
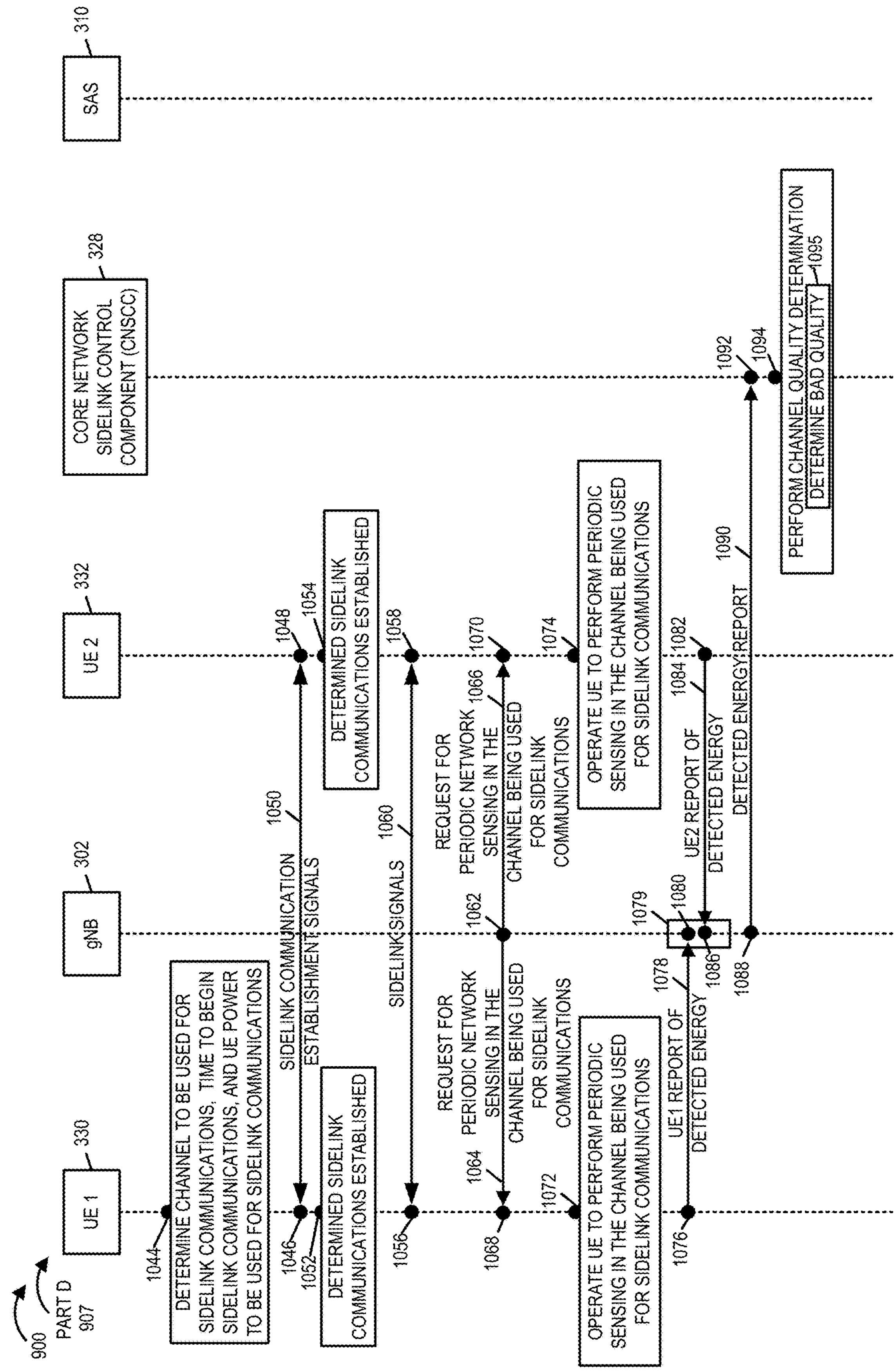
FIG. 7D is a fourth part of an exemplary signaling diagram illustrating exemplary steps and messaging of an exemplary method of supporting efficient device to device sidelink communications between UEs under the control of a core network operating in conjunction with a spectrum access system (SAS) and an interference module in accordance with an exemplary embodiment.

FIG. 6 and FIG. 7 include exemplary message flows in accordance with exemplary embodiments of the present invention. The exemplary message flows show 2 UEs; however, it can be a different number of UEs, e.g., one UE may request a channel to use for device to device sidelink communications signals to be communicated with two UEs in its local vicinity.

Each of the UEs within the coverage area of a gNB sends sounding reference signal (SRS) measurements back to the gNB. The examples of FIGS. 6-7, assume that either one or both of the UEs (UE 1 330, UE 2 332) are within the network coverage area 303 of BS 1 302. In these examples, it is assumed that at least UE 1 330 is within the coverage area of BS 1 302.

Either UE, in a pair of closely located UEs, will request a sidelink communication, e.g., the UE sends a request for possible sidelink communication to the core network. This request can come from a UE in coverage or from a UE out of coverage. For the later case, the UE out of coverage will relay the message to an in-network UE, and the in network UE will take the message back to the gNB. The gNB can also, and sometimes does, determine the need for sidelink communication based on the location of the UE(s) and/or based on offload from the network. For instance, if the UEs are within a reasonable range of each other, the network can, and sometimes does, initiate a sidelink to offload traffic from the network or can supervise when a UE wants to directly talk to another UE.

FIG. 6, comprising the combination of FIG. 6A, FIG. 6B, FIG. 6C and FIG. 6D, is a drawing of an exemplary signaling diagram 600, comprising the combination of Part A 601, Part B 603, Part C 605 and Part D 607, illustrating exemplary steps and messaging of an exemplary method of supporting efficient device to device sidelink communications between UEs under the control of a core network operating in conjunction with a spectrum access system (SAS) in accordance with an exemplary embodiment.

Each UE (e.g., including U1 330 and UE 2 332) generates and transmits a sounding reference signal (SRS), and each UE monitors for and measures detected sounding reference signals from other UEs. In step 602 UE1 330 generates a UE1 sounding reference signal (SRS) 606. In step 604 UE1 330 transmits the generated UE1 SRS 606. In step 608 UE2 332 receives UE1 SRS 606, and in step 610 UE2 332 measures the received UE1 SRS 606. Similarly, in step 612 UE2 332 generates a UE2 sounding reference signal (SRS) 616. In step 614 UE2 332 transmits the generated UE2 SRS 616. In step 618 UE1 330 receives UE2 SRS 616, and in step 620 UE1 330 measures the received UE2 SRS 616.

In step 622 UE2 332 generates a UE2 SRS measurement report 622, said UE2 SRS measurement report including information, e.g., device ID information and received signal strength information, corresponding to the received UE1 SRS 606. In step 624 UE2 332 transmits the generated SRS measurement report 626 to gNB 302. In step 628 gNB 302 receives the UE2 SRS measurement report 626 and recovers and stores the communicated information.

In step 630 UE1 330 generates a UE1 SRS measurement report 634, said UE1 SRS measurement report including information, e.g., device ID information and received signal strength information, corresponding to the received UE2 SRS 616. In step 632 UE1 330 transmits the generated SRS measurement report 634 to gNB 302. In step 636 gNB 302 receives the UE1 SRS measurement report 634 and recovers and stores the communicated information.

In step 638 UE1 330 generates a request for device to device communications 642, e.g., a request for device to device communications between UE1 330 and UE2 332, said request for device to device communications requesting that the gNB grant UE1 330 spectrum, e.g., a channel, to be used for device to device communications without requiring listen-before-talk (LBT) checks. In step 640 UE1 330 sends, e.g., transmits, the generated request for device to device communications 642 to gNB 302. In step 644 gNB 302 receives the request for device to device communications 642 and recovers the communicated information, e.g., information indicating that UE1 330 is seeking to establish device to device communications with UE2 330 and is requesting resources, e.g., frequency-time air link resources, e.g., a channel to be used for sidelink communications.

In some embodiments the gNB 302 generates and sends a request for UE device location to each of the UEs corresponding to the received request for device to device communications, and steps 646, 650, 652, 656, 658 and 660 are performed. In other embodiments, gNB 302 determines the physical location of each of the UEs corresponding to the received request for device to device communications by using positioning procedures, and steps 678 and 680 are performed.

In step 646 gNB 302 generates and sends a request 648 for the physical location of UE1 to UE1 330. In step 650 UE1 330 receives the request 648 for its location. In step 652 gNB 302 generates and sends a request 654 for the physical location of UE2 to UE2 332. In step 656 UE2 332 receives the request 654 for its location. In step 658 UE1 330 determines its location, e.g., based on received and processed GPS signals. In step 660 UE2 332 determines its location, e.g., based on received and processed GPS signals. In step 662 UE1 330 generates a message 668 communicating the location of UE1. In step 664 UE2 332 generates a message 674 communicating the location of UE2. In step 666 UE1 330 sends, e.g., transmits, message 668 communicating the UE1 location to gNB 302. In step 670 gNB receives message 668, recovers the communicated location of UEL and stores the location of UE1. In step 672 UE2 332 sends, e.g., transmits, message 674 communicating the UE2 location to gNB 302. In step 676 gNB 302 receives message 674, recovers the communicated location of UE2 and stores the location of UE2.

In step 678 gNB 302 determines the physical location of UE1 by using positioning procedures. In step 680 gNB 302 determines the physical location of UE2 by using positioning procedures. In some embodiments, the positioning procedures include determining location based on received signals strength measurements and/or received signal direction determinations. In some embodiments, the positioning procedures including contacting a server, which tracks the location of each UE in the network, e.g., based on pings and/or ping responses and/or based on triangulation techniques and/or based on information collected by a plurality of base stations and/or a plurality of UEs, and receiving a response indicating the estimated location of the UEs of interest, e.g., UE1 330 and UE2 332.

In step 682 gNB 302 generates a sidelink possibility inquiry message 686 including locations (UE1 location information, UE2 location information) and UE identities (UE1 ID, UE2 ID) to determine sidelink possibility for the received UE initiated device to device request 642. In step 684 gNB 302 sends the generated sidelink possibility inquiry message 686 to core network sidelink control component (CNSCC) 328, which receives the inquiry message 686 in step 688 and recovers the communicated information.

In step 690 CNSCC 328 determines, based on location information, if sidelink communication is possible, with regard to the received inquiry. Step 690 includes steps 692, 702, and 704. In step 692 CNSCC 328 generates and sends a spectrum inquiry 694 to SAS 310. In step 696 the SAS 310 receives and processes the spectrum inquiry 694. In step 698 the SAS 310 generates and sends a spectrum inquiry response 700 to the CNSCC 328. For example, the spectrum inquiry response 700 includes an indication that spectrum is available and includes information identifying the available spectrum. In some embodiments, the information identifying the spectrum to be used identifies a clean GAA channel or a clean PAL channel. In some embodiments, the information identifying the available spectrum to be used for the sidelink is a narrow channel, e.g., a narrow channel between guard bands of CBRS channels. In step 702 CNSCC 328 receives the spectrum inquiry response and recovers the communicated information. In step 704, the CNSCC 328 determines, based on the received response 700, that sidelink communication is possible.

In step 706 the CNSCC determines which UE will be picked to initiate the sidelink communication, e.g., the CNSCC determines that UE1 330 is to initiate the sidelink communication between UE1 330 and UE2 332. In step 708 the CNSCC generates a sidelink possibility inquiry response message 712 to instruct gNB 302 to allow sidelink communications. In step 710 CNSCC 328 sends sidelink possibility inquiry response message 712 instructing gNB 302 to allow sidelink communications and including information identifying spectrum (e.g., a channel) to be used and identifying the UE (e.g., UE1 330) which has been selected to initiate the device to device communications. In step 714, gNB 302 receives message 712 and recovers the communicated information.

In step 716 gNB 302 determines sync (e.g., frame and time information), Master Information Block (MIB) and channel information to be provided for the sidelink communication. In step 718 gNB 302 generates a sidelink request response message 722 indicating that UE1 330 is allowed to communicate with UE2 332 in unicast or multicast with other device using sidelink, said message including sync, MIB, and channel information corresponding to the allowed sidelink. In some embodiments, the generated sidelink request response message includes UE power level information, e.g., indicating a maximum UE transmission power. In step 720 gNB 302 sends, e.g., transmits, the sidelink request response message 722 indicating sidelink allowed and including sync, MIB and channel information to UE1 330, which receives the message 722 in step 724 and recovers the communicated information.

In step 726 UE1 330 determines the channel to be used for sidelink communications and the time to begin the sidelink communications. In steps 728 and 730 the UE1 330 and UE2 332 are operated, respectively, to communicate, e.g., send and receive, sidelink communication establishment signals 732. In step 734 UE1 330 determines that sidelink communications have been established with UE 2 332. In step 736 UE2 332 determines that sidelink communications have been established with UE 1 330. In steps 737 and 738 UE1 330 and UE2 332 are operated, respectively, to communicate, e.g., send and receive, sidelink signals 739, e.g., communicating traffic data over the indicated (granted) channel.

In step 740 gNB generates and sends a request (742, 744) for periodic network sensing in the channel being used for sidelink communications. In some embodiments, the request is sent as a multicast or broadcast message. In other embodiments, the request is sent as multiple individual unicast messages. In step 746 UE1 330 receives message 742, and in response, in step 750 UE1 330 performs periodic sensing in the channel being used for sidelink communications. In step 748 UE2 332 receives message 744, and in response, in step 752 UE2 332 performs periodic sensing in the channel being used for sidelink communications.

In step 754 UE1 330 generates and sends a UE1 report of detected energy 756 (corresponding to the channel being used for device to device communications during sensing intervals during which UE1 and UE2 are not communicating device to device signals) to gNB 302, which receives the report 756 in step 758 and recovers the communicated information. In step 760 UE2 332 generates and sends a UE2 report of detected energy 762 (corresponding to the channel being used for device to device communications during sensing intervals during which UE1 and UE2 are not communicating device to device signals) to gNB 302, which receives the report 762 in step 764 and recovers the communicated information.

Step 757 includes step 758 and step 764. In step 766 gNB 302 generates detected energy report 768, e.g., an aggregation of reports of detected energy from multiple UEs including UE1 330 and UE2 332, and sends the generated detected energy report 768 to CNSCC 328 which receives the report in step 770 and recovers the communicated information.

In step 772 CNSCC 328 performs a channel quality determination based on the received detected energy report 768 to determine if the channel being used for sidelink communication is acceptable or is bad. For example, the CNSCC (328) compares the detected energy values measured by the first and second UEs which are indicative of noise in the channel to an acceptable noise threshold and if the detected noise energy reported by either UE is above the acceptable noise threshold the channel is determined to be to be bad; otherwise, if the reported energy reported by the UEs is equal to or below the acceptable noise level threshold the channel is determined to be acceptable, i.e., good. In this example, the channel quality determination determines in step 773 bad quality for the channel. Operation proceeds from step 773 to step 774, in which the CNSCC 328 determines if sidelink communications is possible using other spectrum. Step 774 includes steps 776, 786, 788, 794, and 796. In step 776 CNSCC 328 generates and sends spectrum inquiry 788 to SAS 310, which receives and processes the inquiry in step 780. Operation proceeds from step 780 to step 782 or step 790 depending upon the SAS's determination as to whether or not other spectrum is available to be used for the device to device communication.

If the SAS 310 determines that other spectrum is available, then operation proceeds from step 780 to step 782, in which the SAS 310 generates and sends spectrum inquiry response, e.g., indicating that other spectrum, e.g., another channel, is available and including information identifying the spectrum which is to be used, to the CNSCC 328 which receives the spectrum inquiry response message 784 in step 786 and recovers the communicated information. In response to message 784, the CNSCC 328 determines in step 788 that sidelink communication is possible using the other spectrum which has been identified by the SAS 310.

Alternatively, if the SAS 310 determines that other spectrum is not available, then operation proceeds from step 780 to step 790, in which the SAS 310 generates and sends spectrum inquiry response 792, e.g., indicating that other spectrum is not available, to the CNSCC 328 which receives the spectrum inquiry response message 792 in step 794 and recovers the communicated information. In response to message 792, the CNSCC 328 determines in step 796 that sidelink communication is not possible.

Operation proceeds from step 788 of step 774 to step 798, in which CNSCC 328 generates and sends message 800 to gNB 302 instructing gNB 302 to move UE1 330 sidelink communications with UE2 332 to a different channel, said message indicating new channel information. In step 802 gNB 302 receives message 800 and implements the instructions, e.g., generating and sending a message to UE1 332 to command UE1 330 to move the sidelink communications with UE2 332 to the identified different channel.

Alternatively, operation proceeds from step 796 of step 774 to step 804, in which CNSCC 328 generates and sends message 806 to gNB 302 revoking the previous grant for sidelink communication for UE1 330. In step 808 gNB 302 receives message 806 and implements the instructions, e.g., generating and sending a message to UE1 332 to command UE1 330 to cease sidelink communication with UE2 332 on the previous granted channel.

FIG. 7, comprising the combination of FIG. 7A, FIG. 7B, FIG. 7C, FIG. 7D, FIG. 7E, FIG. 7F and FIG. 7G, is a drawing of an exemplary signaling diagram 900, comprising the combination of Part A 901, Part B 903, Part C 905, Part D 907, Part E 909, Part F 911, and Part G 913, illustrating exemplary steps and messaging of an exemplary method of supporting efficient device to device sidelink communications between UEs under the control of a core network operating in conjunction with a spectrum access system (SAS) and an interference module in accordance with an exemplary embodiment.

Each UE (e.g., including U1 330 and UE 2 332) generates and transmits a sounding reference signal (SRS), and each UE monitors for and measures detected sounding reference signals from other UEs. In step 902 UE1 330 generates a UE1 sounding reference signal (SRS) 906. In step 904 UE1 330 transmits the generated UE1 SRS 906. In step 908 UE2 332 receives UE1 SRS 906, and in step 910 UE2 332 measures the received UE1 SRS 906. Similarly, in step 912 UE2 332 generates a UE2 sounding reference signal (SRS) 916. In step 914 UE2 332 transmits the generated UE2 SRS 916. In step 918 UE1 330 receives UE2 SRS 916, and in step 920 UE1 330 measures the received UE2 SRS 916.

In step 922 UE2 332 generates a UE2 SRS measurement report 926, said UE2 SRS measurement report including information, e.g., device ID information and received signal strength information, corresponding to the received UE1 SRS 906. In step 924 UE2 332 transmits the generated SRS measurement report 926 to gNB 302. In step 928 gNB 302 receives the UE2 SRS measurement report 926 and recovers and stores the communicated information.

In step 930 UE1 330 generates a UE1 SRS measurement report 934, said UE1 SRS measurement report including information, e.g., device ID information and received signal strength information, corresponding to the received UE2 SRS 916. In step 932 UE1 330 transmits the generated SRS measurement report 934 to gNB 302. In step 936 gNB 302 receives the UE1 SRS measurement report 934 and recovers and stores the communicated information.

In step 938 UE1 330 generates a request for device to device communications 942, e.g., a request for device to device communications between UE1 330 and UE2 332, said request for device to device communications requesting that the gNB grant UE1 330 spectrum, e.g., a channel, to be used for device to device communications without requiring listen-before-talk (LBT) checks. In step 940 UE1 330 sends, e.g., transmits, the generated request for device to device communications 942 to gNB 302. In step 944 gNB 302 receives the request for device to device communications 942 and recovers the communicated information, e.g., information indicating that UE1 330 is seeking to establish device to device communications with UE2 330 and is requesting resources, e.g., frequency-time air link resources, e.g., a channel to be used for sidelink communications.

In some embodiments the gNB 302 generates and sends a request for UE device location to each of the UEs corresponding to the received request for device to device communications, and steps 946, 950, 952, 956, 958 and 960 are performed. In other embodiments, gNB 302 determines the physical location of each of the UEs corresponding to the received request for device to device communications by using positioning procedures, and steps 978 and 980 are performed.

In step 946 gNB 302 generates and sends a request 948 for the physical location of UE1 to UE1 330. In step 950 UE1 330 receives the request 948 for its location. In step 952 gNB 302 generates and sends a request 954 for the physical location of UE2 to UE2 332. In step 956 UE2 332 receives the request 954 for its location. In step 958 UE1 330 determines its location, e.g., based on received and processed GPS signals. In step 960 UE2 332 determines its location, e.g., based on received and processed GPS signals. In step 962 UE1 330 generates a message 968 communicating the location of UE1. In step 964 UE2 332 generates a message 974 communicating the location of UE2. In step 966 UE1 330 sends, e.g., transmits, message 968 communicating the UE1 location to gNB 302. In step 970 gNB receives message 968, recovers the communicated location of UEL and stores the location of UE1. In step 972 UE2 332 sends, e.g., transmits, message 974 communicating the UE2 location to gNB 302. In step 976 gNB 302 receives message 974, recovers the communicated location of UE2 and stores the location of UE2.

In step 978 gNB 302 determines the physical location of UE1 by using positioning procedures. In step 980 gNB 302 determines the physical location of UE2 by using positioning procedures. In some embodiments, the positioning procedures include determining location based on received signals strength measurements and/or received signal direction determinations. In some embodiments, the positioning procedures including contacting a server, which tracks the location of each UE in the network, e.g., based on pings and/or ping responses and/or based on triangulation techniques and/or based on information collected by a plurality of base stations and/or a plurality of UEs, and receiving a response indicating the estimated location of the UEs of interest, e.g., UE1 330 and UE2 332.

In step 982 gNB 302 generates a sidelink possibility inquiry message 986 including locations (UE1 location information, UE2 location information) and UE identities (UE1 ID, UE2 ID) to determine sidelink possibility for the received UE initiated request 942 for device to device communications. In step 984 gNB 302 sends the generated sidelink possibility inquiry message 986 to core network sidelink control component (CNSCC) 328, which receives the inquiry message 986 in step 988 and recovers the communicated information.

In step 990 CNSCC 328 determines, based on location information, if sidelink communication is possible, with regard to the received inquiry. Step 990 includes steps 992, 1002, 1004, 1005, 1006, 1018, 1020 and 1021. In step 992 CNSCC 328 generates and sends a spectrum inquiry 994 to SAS 310. In step 996 the SAS 310 receives and processes the spectrum inquiry 994. In step 998 the SAS 310 generates and sends a spectrum inquiry response 1000 to the CNSCC 328. For example, the spectrum inquiry response 1000 includes an indication that spectrum is not available, e.g., there is no clean PAL channel which is available and there is no clean GAA channel which is available. In step 1002 CNSCC 328 receives the spectrum inquiry response and recovers the communicated information. In step 1004, the CNSCC 328 determines, based on the received response 700, that sidelink communication is not possible using a clean PAL or clean GAA channel. Alternatively, if the spectrum inquiry response message 1000 indicates that a clean PAL channel or clean GAA channel is available, then the CNSCC 328 determines in step 1005, that sidelink communications is possible using a clean PAL channel or a clean GAA channel, and operation proceeds from step 1005 to step 1021 in which the CNSCC 328 determines that sidelink communications is possible for high quality communications, and the CNSCC 328 subsequently sends a sidelink possibility inquiry response message (similar to message 712) to the gNB instructing the gNB to allow sidelink communications and including information identifying the spectrum (e.g., the clean PAL channel or the clean GAA channel) to be used and further identifying the UE, e.g., UE1 330 selected to initiate the sidelink communications.

Returning to step 1004, operation proceeds from step 1004 to step 1006. In step 1006 the CNSCC 328 generates and sends a request 1008 to interference module 312 to determine area of influence and cleanest channel. In various embodiments, the request includes information, e.g., UE device IDs, identifying the UEs which are seeking air link resources, e.g., a channel, to perform device to device communications. In step 1010, the interference module 312 receives the request. In step 1012 the interference module 312 determines the area of influence and determines the cleanest channel to be used for sidelink communications, e.g., using information the interference module 312 already has including, e.g., the location of gNB, UEs locations (including location of UEL 330 and location of UE2 332), interference information and channel information including current channel usage information). In step 1014 interference module 312 generates and sends a response message 1016 to the CNSCC 328, said response including information identifying the cleanest channel. In some embodiments, the identified cleanest channel is a sparsely used channel. In some embodiments, the response message 1016 further includes information identifying the quality level of the identified cleanest channel and/or information identifying the amount and/or level of sidelink communications (e.g., data rate and/or UE transmit power level information) which are to be permitted on the identified cleanest channel. In step 1018 CNSCC 328 receives the response message 1016 and recovers the communicated information. In step 1020 the CNSCC 328 determines that sidelink communication is possible, e.g., for low quality communications, e.g., for file transfer, using the cleanest channel which was identified by the interference module 312. Operation proceeds from step 1020 of step 990 to step 1022 of FIG. 7C.

In step 1022 the CNSCC 328 determines the power needed for UEs to communicate using the channel with minimal interference to other radios/UEs operating in the channel. In step 1024, the CNSCC 328 determines which UE, e.g., UE1 330, will be picked to initiate the sidelink communication. In step 1026 the CNSCC 328 generates a sidelink possibility inquiry response message 1030 to instruct the gNB 328 to allow sidelink communications, said message including channel information and UE(s) power information. In step 1028, the CNSCC 328 sends sitelink possibility inquiry response message 1030 to gNB 302, said sidelink possibility inquiry response message instructing the gNB 302 to allow sidelink communications, said message including information identifying spectrum (e.g., a channel) to be used and UE(s) power level information (e.g., maximum transmit power level information) and information identifying the UE, e.g. UE1 330, selected to initiate the sidelink communications. In step 1032 the gNB 302 receives the sidelink possibility inquiry response message 1030 and recovers the communicated information.

In step 1034 gNB 302 determines sync (e.g., frame and time information), Master Information Block (MIB) and channel information to be provided for the sidelink communication. In step 1036 gNB 302 generates a sidelink request response message 1040 indicating that UE1 330 is allowed to communicate with UE2 332 in unicast or multicast with other device using sidelink, said message including sync, MIB, and channel information corresponding to the allowed sidelink, and further including UE power information. In step 1038 gNB 302 sends, e.g., transmits, the sidelink request response message 1040 indicating sidelink allowed and including sync, MIB and channel information, and UE power information to UE1 330, which receives the message 1040 in step 1042 and recovers the communicated information.

In step 1044 UE1 330 determines the channel to be used for sidelink communications, the time to begin the sidelink communications, and UE power to be used for sidelink communications. In steps 1046 and 1048 the UE1 330 and UE2 332 are operated, respectively, to communicate, e.g., send and receive, sidelink communication establishment signals 1050. In step 1052 UE1 330 determines that sidelink communications have been established with UE 2 332. In step 1054 UE2 332 determines that sidelink communications have been established with UE 1 330. In steps 1056 and 1058 UE1 330 and UE2 332 are operated, respectively, to communicate, e.g., send and receive, sidelink signals 1060, e.g., communicating traffic data over the indicated (granted) channel.

In step 1062 gNB 302 generates and sends a request (1064, 1066) for periodic network sensing in the channel being used for sidelink communications. In some embodiments, the request is sent as a multicast or broadcast message. In other embodiments, the request is sent as multiple individual unicast messages. In step 1068 UE1 330 receives message 1064, and in response, in step 1072 UE1 330 performs periodic sensing in the channel being used for sidelink communications. In step 1070 UE2 332 receives message 1066, and in response, in step 1074 UE2 332 performs periodic sensing in the channel being used for sidelink communications.

In step 1076 UE1 330 generates and sends a UE1 report of detected energy 1078 (corresponding to the channel being used for device to device communications during sensing intervals during which UE and UE2 are not communicating device to device signals) to gNB 302, which receives the report 1078 in step 1080 and recovers the communicated information. In step 1082 UE2 332 generates and sends a UE2 report of detected energy 1084 (corresponding to the channel being used for device to device communications during sensing intervals during which UE1 and UE2 are not communicating device to device signals) to gNB 302, which receives the report 1084 in step 1086 and recovers the communicated information.

Step 1079 includes step 1080 and step 1086. In step 1088 gNB 302 generates detected energy report 1090, e.g., an aggregation of reports of detected energy from multiple UEs including UE1 330 and UE2 332) and sends the generated detected energy report 1090 to CNSCC 328 which receives the report in step 1092 and recovers the communicated information.

In step 1094 CNSCC 328 performs a channel quality determination based on the received detected energy report 1090 to determine if the channel being used for sidelink communication is acceptable or is bad. For example, the CNSCC (328) compares the detected energy values measured by the first and second UEs which are indicative of noise in the channel to an acceptable noise threshold and if the detected noise energy reported by either UE is above the acceptable noise threshold the channel is determined to be to be bad; otherwise, if the reported energy reported by the UEs is equal to or below the acceptable noise level threshold the channel is determined to be acceptable, i.e., good. In this example, the channel quality determination determines in step 1095 bad quality for the channel. Operation proceeds from step 1095 to step 1096, in which the CNSCC 328 determines if sidelink communications is possible using a cleaner channel. Step 1096 includes steps 1098, 1108, 1110, 1112, 1124, and 1126. In step 1098 CNSCC 328 generates and sends spectrum inquiry 1100 to SAS 310, which receives and processes the inquiry in step 1102.

In step 1104 the SAS 310 generates and sends spectrum inquiry response 1106, e.g., indicating spectrum is not available (e.g., indicating that no clean PAL channel is available and no clean GAA channel is available), to the CNSCC 328 which receives the spectrum inquiry response message 1106 in step 1108 and recovers the communicated information. In this example, in response to message 1106, CNSCC 328 determines in step 1110 that sidelink communication is not possible using a clean PAL or clean GAA channel.

In step 1112 the CNSCC 328 generates and sends a request 1114 to interference module 312 to determine area of influence and cleanest channel. In various embodiments, the request includes information, e.g., UE device IDs, identifying the UEs which are seeking air link resources, e.g., a channel, to perform device to device communications. In step 1116 the interference module 312 receives the request message 1114. In step 1118 the interference module 312 determines the area of influence and determines the cleanest channel to be used for sidelink communications, e.g., using information the interference module 312 already has including, e.g., the location of gNB, UEs locations (including location of UE1 330 and location of UE2 332), interference information and channel information including current channel usage information). In step 1120 interference module 312 generates and sends a response message 1122 to the CNSCC 328, said response including information identifying the cleanest channel. In some embodiments, the response message 1122 further includes information identifying the quality level of the identified cleanest channel and/or information identifying the amount and/or level of sidelink communications (e.g., data rate and/or UE transmit power level information) which are to be permitted on the identified cleanest channel. In step 1124 CNSCC 328 receives the response message 1122 and recovers the communicated information. In step 1126 the CNSCC 328 determines if the newly identified cleanest channel is different from the channel which is currently being used for the sidelink communications. If the newly identified cleanest channel is different than the channel in use, then step 1128 is performed, in which the CNSCC 328 determines that sidelink communications is possible, e.g., for low quality communications, e.g., for file transfer, on the newly identified cleaner channel. Alternatively, if the newly identified cleanest channel is the same as the channel in use, then step 1130 is performed, in which the CNSCC 328 determines that sidelink communications is not possible on a cleaner channel.

Figure 7E:
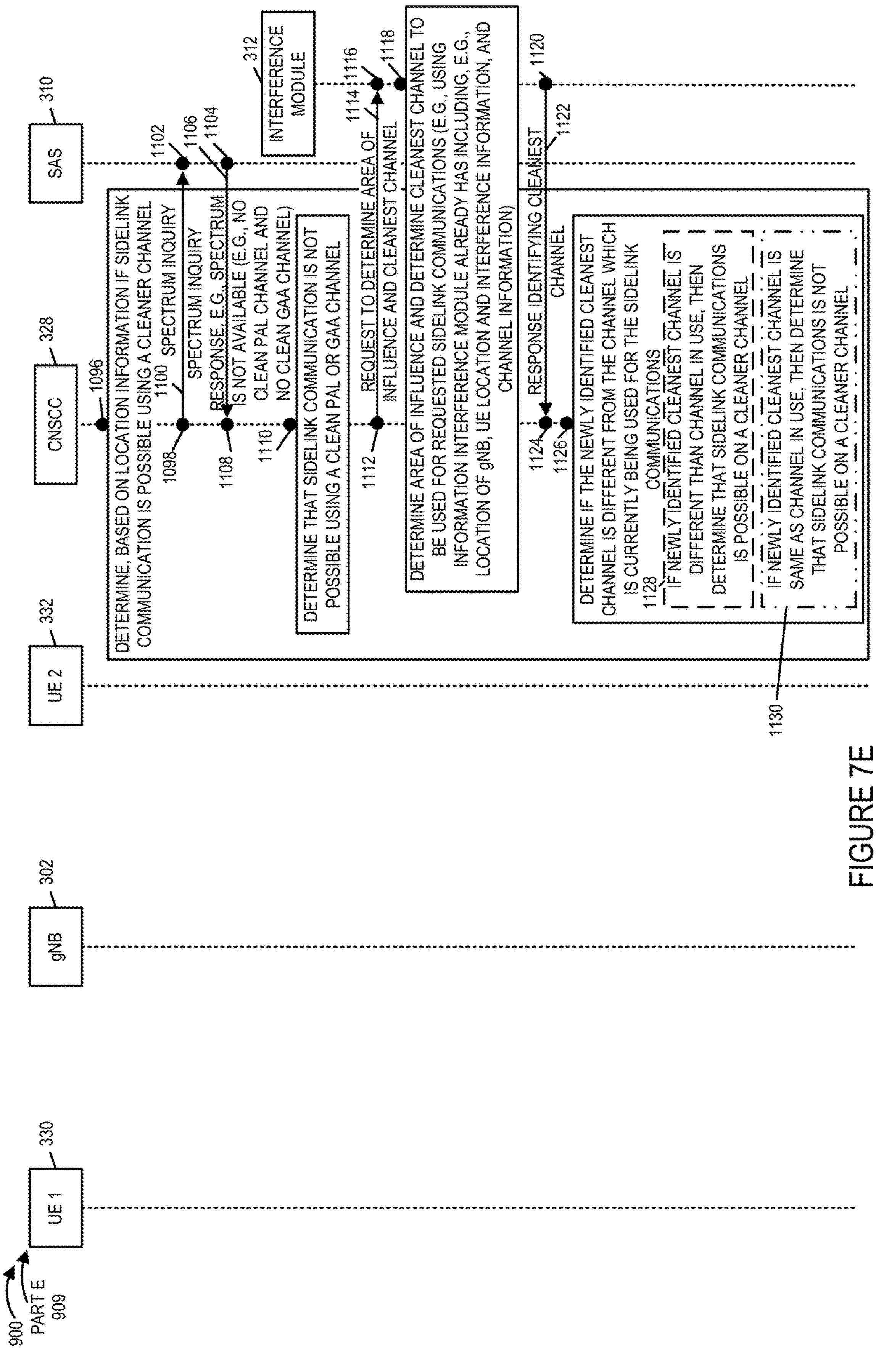
FIG. 7E is a fifth part of an exemplary signaling diagram illustrating exemplary steps and messaging of an exemplary method of supporting efficient device to device sidelink communications between UEs under the control of a core network operating in conjunction with a spectrum access system (SAS) and an interference module in accordance with an exemplary embodiment.
Figure 7F:
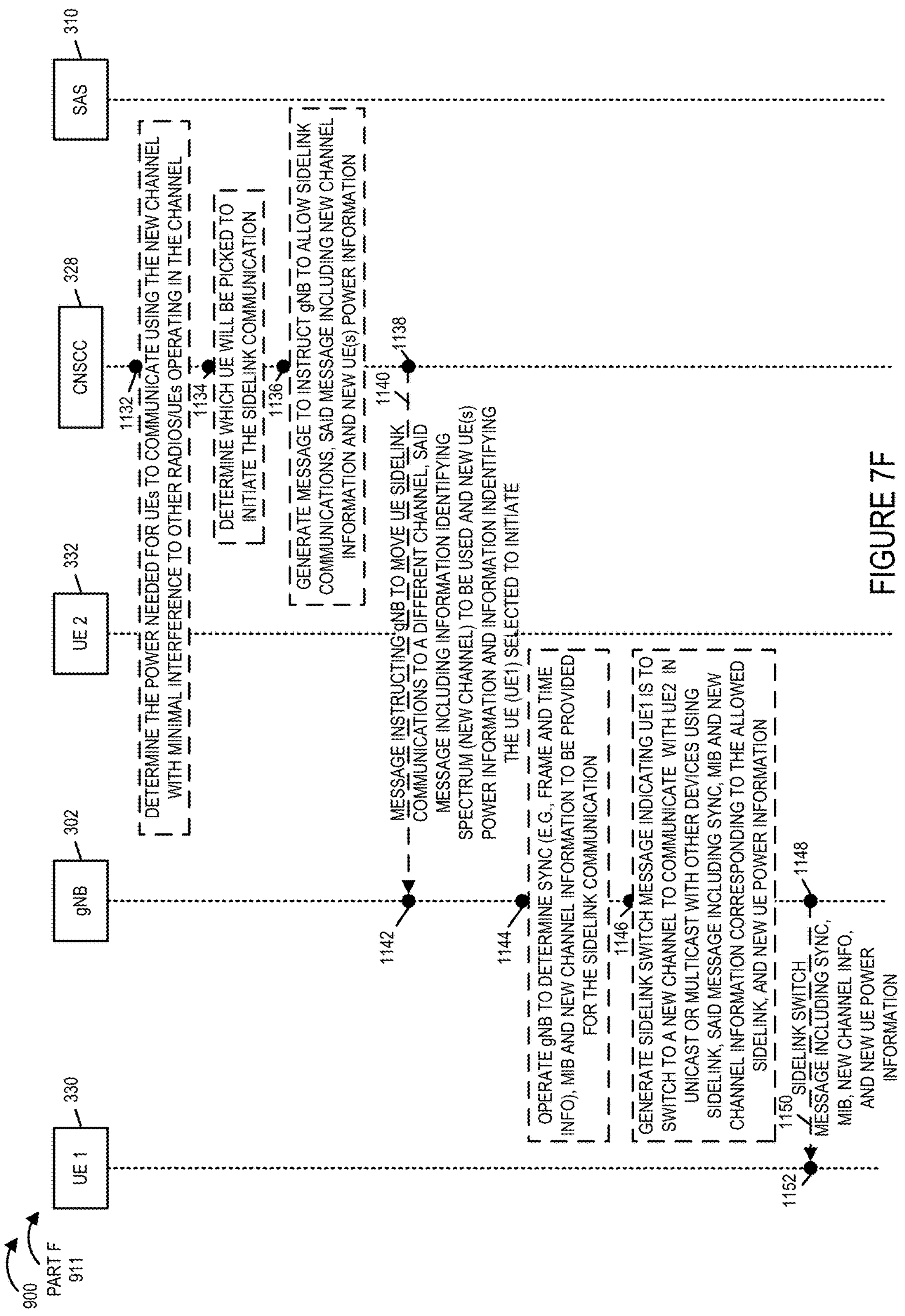
FIG. 7F is a sixth part of an exemplary signaling diagram illustrating exemplary steps and messaging of an exemplary method of supporting efficient device to device sidelink communications between UEs under the control of a core network operating in conjunction with a spectrum access system (SAS) and an interference module in accordance with an exemplary embodiment.
Figure 7G:
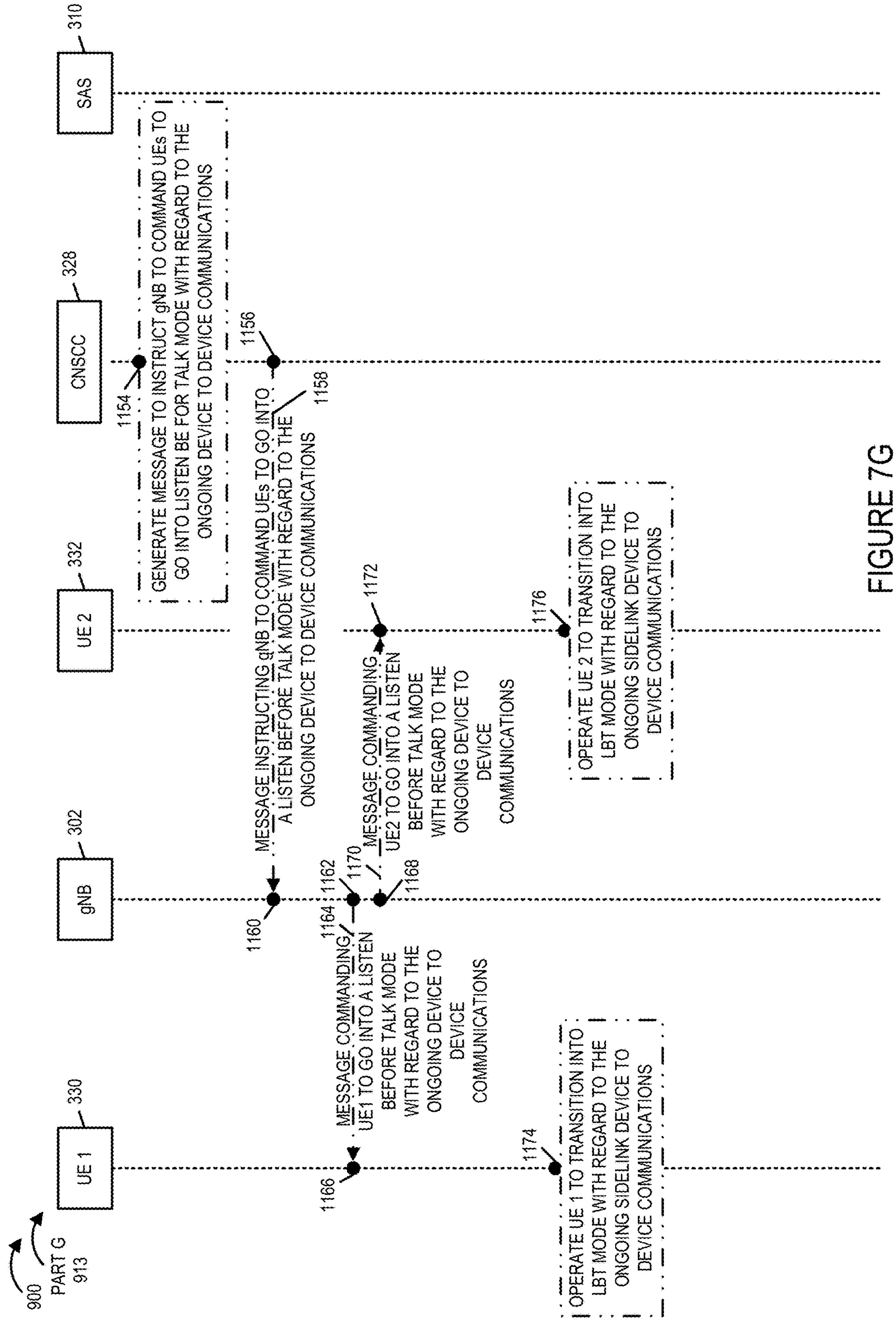
FIG. 7G is a seventh part of an exemplary signaling diagram illustrating exemplary steps and messaging of an exemplary method of supporting efficient device to device sidelink communications between UEs under the control of a core network operating in conjunction with a spectrum access system (SAS) and an interference module in accordance with an exemplary embodiment.

Operation proceeds from step 1128 to step 1132 of FIG. 7F, or alternatively, operation proceeds from step 1130 to step 1154 of FIG. 7G. In step 1132 the CNSCC 328 determines the power (e.g., maximum transmission power level) needed for UEs to communicate using the new channel with minimum interference (e.g., an acceptable allowed level of interference) to other radios/UEs operating in the channel. Operation proceeds from step 1132 to step 1134, in which the CNSCC 328 determines which UE, e.g., UE1 330, will be picked to initiate the sidelink communications. Operation proceeds from step 1134 to step 1136. In step 1136 the CNSCC 328 generates message 1140 which instructs gNB 302 to allow sidelink communications, said message including new channel information and new UE(s) power information. In step 1138 the SNSCC 328 sends generated message 1140 to gNB 302, said message 1140 instructing the gNB to move sidelink communications to a different channel, said message including information identifying spectrum (new channel) to be used and new UE(s) power information, e.g., maximum transmit power information, and information identifying the UE, e.g., UE1 330, which has been selected to initiate the device to device communications on the new channel, e.g., at a specified time.

In step 1142 the gNB 302 receives the message 1140 instructing the gNB 302 to move the UE sidelink communication to a different channel and recovers the communicated information. In step 1144 gNB 302 determines SYNC (e.g., frame and time information), MIB information, and new channel information to be provided for the sidelink communication. In step 1146 the gNB generates a sidelink switch message 1150 indicating UE1 330 is to switch to a new channel to communicate with UE2 in unicast or multicast with other devices using sidelink, said message 1150 including sync information, MIB information and new channel information corresponding to allowed sidelink and new UE power information. In step 1148, gNB 302 sends, e.g., transmits, the sidelink switch message 1150 including sync information, MIB information, new channel information, and new UE power information to UE1 330, which receives the message 1150 in step 1152 and implements the sidelink channel switch at the appropriate time, e.g., in accordance with instructions included in message 1150. In some embodiments, gNB 302 also communicates a sidelink switch message to UE2 332, while in other embodiments, UE1 302 communicates received sidelink switch information to UE2 332.

Returning to step 1130 of FIG. 7E, operation proceeds from step 1130 to step 1154 of FIG. 7G. In step 1154 the CNSCC 328 generates message 1154 instructing gNB 302 to command UEs (e.g., UE1 330 and UE2 332) to go into a listen-before-talk (LBT) mode with regard to the ingoing device to device communications. In step 1156, the CNSCC 328 sends message 1158 to gNB 302, which receives the message in step 1160 and recovers the communicated information. In step 1162 gNB 302 generates and sends message 1164 commanding UE1 330 to go into a LBT mode with regard to ongoing device to device communications. In step 1166 UE1 330 receives message 1164 and recovers the communicated information. In step 1168 gNB 302 generates and sends message 1170 commanding UE2 332 to go into a LBT mode with regard to ongoing device to device communications. In step 1172 UE2 332 receives message 1170 and recovers the communicated information. In step 1174 UE1 330, in response to receiving message 1164, transitions into a LBT mode with regard to ongoing device to device communications. In step 1176 UE2 332, in response to receiving message 1170, transitions into a LBT mode with regard to ongoing device to device communications.

Figure 8:
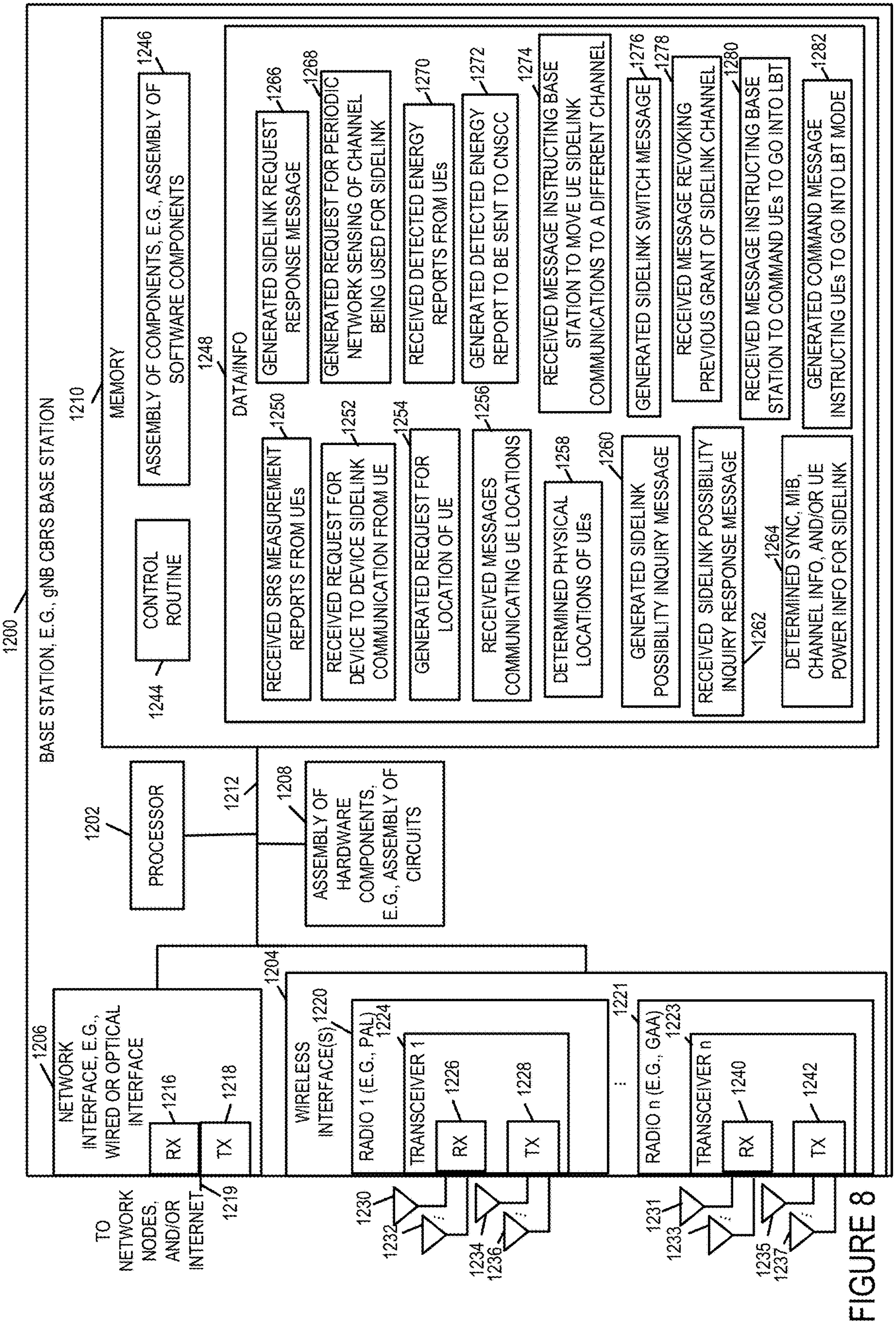
FIG. 8 is a drawing of an exemplary base station, e.g., a gNB CBRS base station, in accordance with an exemplary embodiment.

FIG. 8 is a drawing of an exemplary base station 1200, e.g., a gNB CBRS base station, in accordance with an exemplary embodiment. Exemplary base station 1200 is, e.g., base station 1 302, e.g., a gNB CBRS base station, of system 300 of FIG. 3, of FIG. 6 and/or of FIG. 7, or base station N 304, e.g., a gNB CBRS base station of system 300 of FIG. 3. Base station 1200 includes a processor 1202, e.g., a CPU, wireless interfaces 1204, a network interface 1206, e.g., a wired or optical interface, an assembly of hardware components 1208, e.g., an assembly of circuits, and memory 1210 coupled together via a bus 1212 over which the various elements may interchange data and information.

Wireless interfaces 1204 includes a plurality of radios (radio 1 1220, e.g., a PAL radio, . . . , radio n 1221, e.g., a GAA radio). Radio 1 1220 includes transceiver 1 1224 which includes wireless receiver 1226 and wireless transmitter 1228. Wireless receiver 1226 is coupled to a plurality of receive antennas or receive antenna elements (1230, . . . , 1232) via which the wireless receiver 1226 receives wireless signals, e.g., from UEs being served by the base station 1200. Wireless transmitter 1228 is coupled to a plurality of transmit antennas or transmit antenna elements (1234, . . . , 1236) via which the wireless transmitter 1228 transmits wireless signals, e.g., to UEs being served by the base station 1200. Radio n 1222 includes transceiver n 1223 which includes wireless receiver 1240 and wireless transmitter 1242. Wireless receiver 1240 is coupled to a plurality of receive antennas or receive antenna elements (1231, . . . , 1233) via which the wireless receiver 1240 receives wireless signals, e.g., from UEs being served by the base station 1200. Wireless transmitter 1242 is coupled to a plurality of transmit antennas or transmit antenna elements (1235, . . . , 1237) via which the wireless transmitter 1242 transmits wireless signals, e.g., to UEs being served by the base station 1200.

Memory 1210 includes control routine 1244, assembly of components 1246, e.g., an assembly of software components, and data/information 1248. Control routine 1244 includes machine executable instructions, which when executed by processor 1202 control the base station 1200 to perform basic operations including read to memory, write to memory, operate an interface, etc. Assembly of software components 1244 includes machine executable instructions, which when executed by processor 1202 controls the base station 1200 to perform steps of an exemplary method in accordance with the present invention, e.g., steps of the method of signaling diagram 600 of FIG. 6 and/or steps of the signaling diagram 900 of FIG. 7, which are performed by base station 302.

Data/information 1248 includes received SRS measurement reports from UEs 1250, a received request for device to device sidelink communications from a UE 1252, a generated request for location of a UE 1254, received messages communicating UE location 1256, determined physical locations of UEs 1258, a generated sidelink possibility inquiry message 1260, a received sidelink possibility inquiry response message 1262, determined sync, MIB, channel information, and/or UE power information for sidelink communications 1264, a generated sidelink request response message 1266, a generated request for periodic network sensing of a channel being used for sidelink 1268, received detected energy reports from UEs 1270, a generated detected energy report to be sent to CNSCC 1272, a received message instructing the base station to move UE sidling communications to a different channel 1274, a generated sidelink switch message to be sent to UE(s) 1276, a received message revoking a previous grant of a sidelink channel 1278, a received message instructing the base station to command UEs to go int LBt with regard to sidelink communications 1280, and a generated command message to be sent to UEs instructing the UEs to go into LBT mode with regard to sidelink communications 1282.

Figure 9:
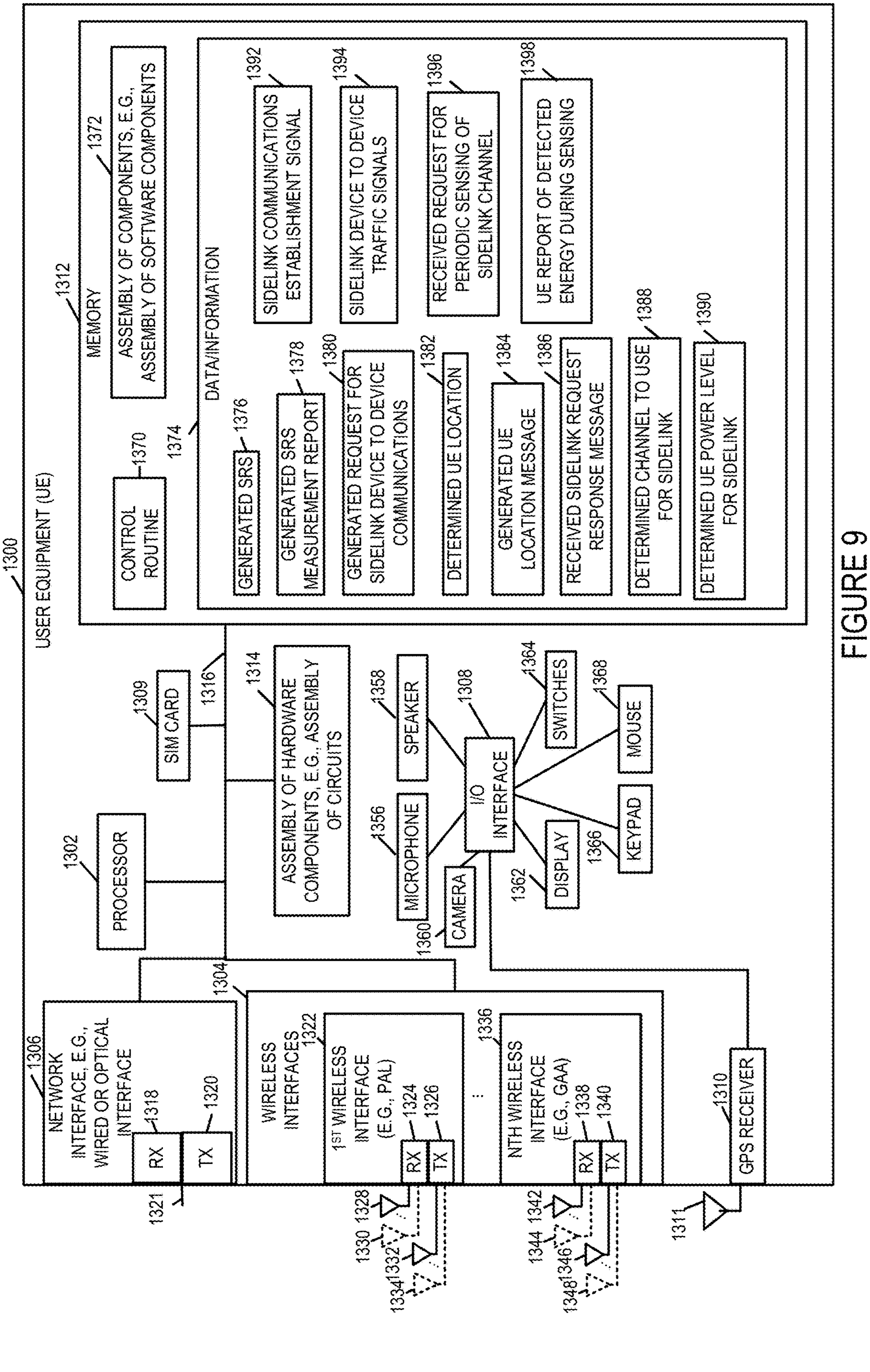
FIG. 9 is a drawing of an exemplary user equipment (UE) in accordance with an exemplary embodiment.

FIG. 9 is a drawing of an exemplary user equipment (UE) 1300 in accordance with an exemplary embodiment. Exemplary UE 1300 is, e.g., any of the UEs (UE 1 330, UE2 332, UE 3 334, UE4 336, UE5 338, UE6 340, UE7 342, UE8 344, UE9 346, UE10 348, UE11 350, UE12 352, UE13 354, UE14 356, UE15 358, UE16 360, UE17 362, UE18 364, UE19 366, . . . , UEn 369) of system 300 of FIG. 3, FIG. 6 and/or FIG. 7.

Exemplary UE 1300 includes a processor 1302, e.g., a CPU, wireless interfaces 1304, network interface 1306, I/O interface 1308, SIM card 1309, GPS receiver 1310, memory 1312, and assembly of hardware components 1314, e.g., an assembly of circuits, coupled together via a bus 1316 over which the various elements may interchange data and information. Wireless interfaces 1304 include a plurality of wireless interfaces (1st wireless interface 1322, e.g., a PAL wireless interface, . . . Nth wireless interface 1336, e.g., a GAA wireless interface). 1st wireless interface 1322 includes wireless receiver 1324 and wireless transmitter 1326. Wireless receiver 1324 is coupled to one or more receive antennas or receive antenna elements (1328, . . . , 1330) via which the wireless receiver 1324 receives wireless signals, e.g., from a base station or from another UE. Wireless transmitter 1326 is coupled to one or more transmit antennas or transmit antenna elements (1332, . . . , 1334) via which the wireless transmitter 1326 transmits wireless signals, e.g., to a base station or to another UE. Nth wireless interface 1336 includes wireless receiver 1338 and wireless transmitter 1340. Wireless receiver 1338 is coupled to one or more receive antennas or receive antenna elements (1342, . . . , 1344) via which the wireless receiver 1338 receives wireless signals, e.g., from a base station or from another UE. Wireless transmitter 1340 is coupled to one or more transmit antennas or transmit antenna elements (1346, . . . , 1348) via which the wireless transmitter 1340 transmits wireless signals, e.g., to a base station or to another UE. Network interface 1306 includes receiver 1318, transmitter 1320 and connector 1321. Network interface 1306 may be, and sometimes is, used by UE 1300 when the UE 1300 is stationary and located at a site where a wired or optical connection is available.

GPS receiver 1310 is coupled to GPS antenna 1311, via which the UE 1300 receives GPS signals. The GPS receiver 1310 processes the received GPS signals to determine time, UE 1300 position, e.g., latitude, longitude and altitude, UE velocity information, and/or UE navigation information.

UE 1300 further includes a plurality of I/O devices (microphone 1356, speaker 1358, camera 1360, display 1362, e.g., a touch screen display, switches 1364, keypad 1366 and mouse 1368, coupled to I/O interface 1308 via which the various I/O devices may communicate with other elements within UE 1300.

Memory 1312 includes control routine 1370, assembly of components 1372, e.g., an assembly of software components, and data/information 1374. Control routine 1370 includes machine executable instructions, which when executed by processor 1302 control the UE 1300 to perform basic operations including read to memory, write to memory, operate an interface, etc. Assembly of software components 1372 includes machine executable instructions, which when executed by processor 1302 control the UE 1300 to perform steps of an exemplary method in accordance with the present invention, e.g., steps of the method of signaling diagram 600 of FIG. 6 and/or steps of the signaling diagram 900 of FIG. 7, which are performed by UE1 320 or UE2 322.

Data/information 1374 includes a generated SRS 1376, a generated SRS measurement report 1378, a generated request for sidelink device to device communications 1380, a determined UE location 1382, a generated UE location message 1384, a received sidelink request response message 1386, a determined channel to used for sidelink communications 1388, a determined UE power level (e.g., maximum allowed UE transmit power level) for sidelink communications on the granted channel 1390, sidelink communications establishment signals 1392, sidelink device to device traffic signals 1394, a received request for periodic sensing of the sidelink channel 1396 and a UE report of detected energy during sensing 1398.

Figure 10:
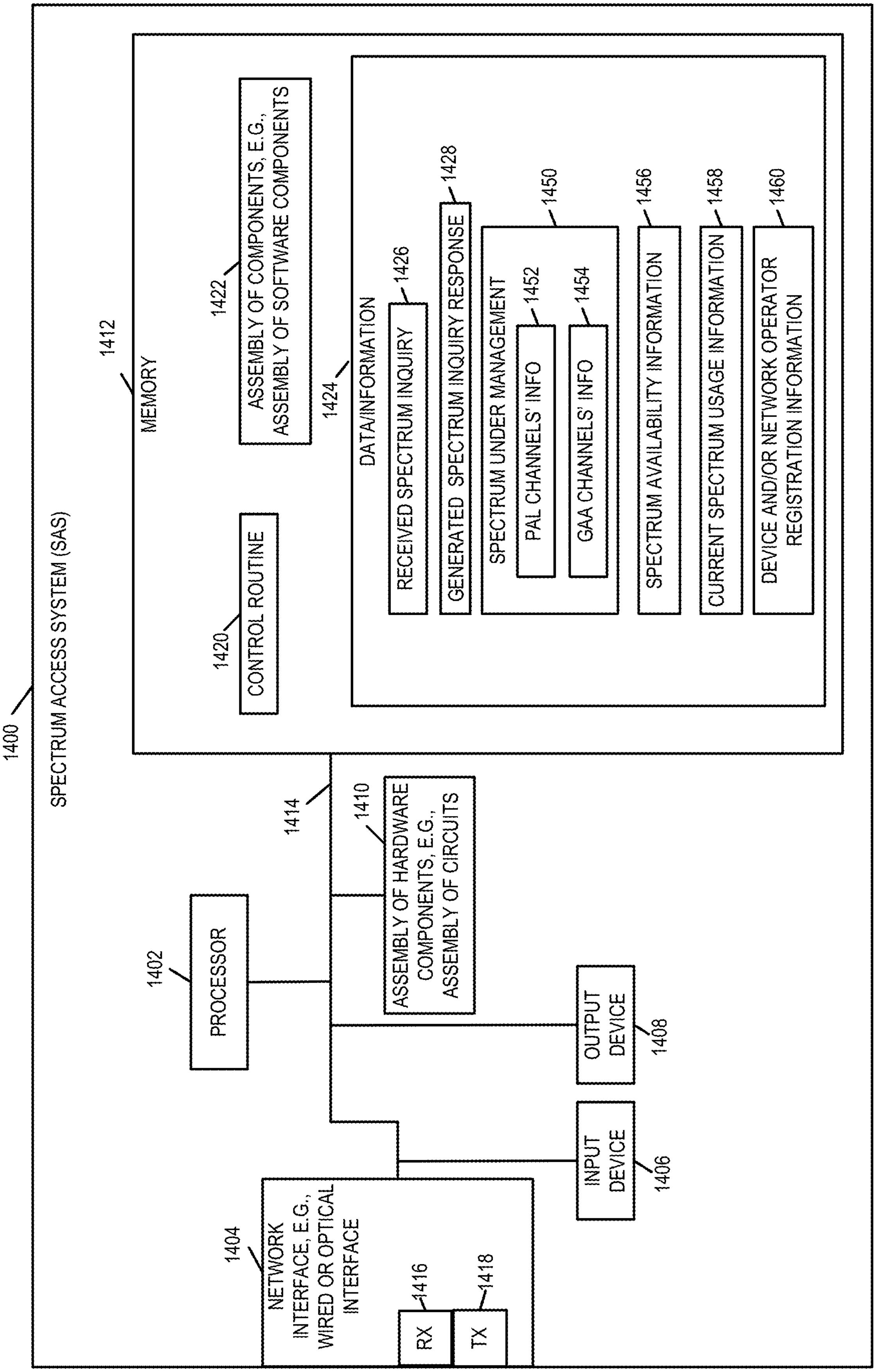
FIG. 10 is drawing of an exemplary spectrum access system (SAS), in accordance with an exemplary embodiment.

FIG. 10 is a drawing of an exemplary spectrum access system (SAS) 1400 in accordance with an exemplary embodiment. SAS 1400 is, e.g., SAS 310 of system 300 of FIG. 3, of FIG. 6 and of FIG. 7. SAS 1400 includes a processor 1402, e.g., a CPU, a network interface 1404, e.g., a wired or optical interface, an input device 1406, e.g., a keyboard or mouse, an output device 1410, e.g., a display, an assembly of hardware components 1410, e.g., an assembly of circuits, and memory 1412 coupled together via a bus 1414 over which the various elements may interchange data and information.

Network interface 1404 includes a receiver 1416 and a transmitter 1418. Memory 1412 includes a control routine 1420, an assembly of components 1422, e.g., an assembly of software components, and data/information 1424. Control routine 1420 includes machine executable instructions, which when executed by processor 1402 controls the SAS 1400 to perform basic operations including read to memory, write to memory, operate an interface, etc. Assembly of software components 1422 includes machine executable instructions, which when executed by processor 1402 control the SAS 1400 to perform steps of an exemplary method in accordance with the present invention, e.g., steps of the method of signaling diagram 600 of FIG. 6 and/or steps of the signaling diagram 900 of FIG. 7, which are performed by SAS 310.

Data/information 1424 includes a received spectrum inquiry 1426, a generated spectrum inquiry response 1428, information 1450 regarding spectrum under management including PAL channels' information 1452 and GAA channels information 1454, spectrum availability information 1456, current spectrum usage information 1458 and device and/or network operator registration information 1460.

NUMBERED LIST OF EXEMPLARY METHOD EMBODIMENTS

Method Embodiment 1. A communications method, the method comprising: receiving (644 of FIG. 6 or 944 of FIG. 7), at a base station (302), a sidelink request (642 of FIG. 6 or 942 of FIG. 7) from a first UE (330) for device to device communication between the first UE (330) and a second UE (332); sending, from the base station, (684 or 984) a sidelink possibility inquiry message (686 or 986) including information identifying the first and second UEs (and optionally the location of the first and second UEs) to a core network sidelink control component (CNSCC) (328); receiving (714 or 1032), at the base station (302), a sidelink possibility response message (712 or 1030) from the CNSCC (328); generating (718 or 1036) a sidelink request response message (722 or 1040) based on information included in said sidelink possibility response message (712 or 1030); and sending (720 or 1038), from the base station (302), the sidelink request response message (722 or 1040) to the first UE (330) (e.g., the UE 330 requesting authorization to proceed with device to device communication with the second UE (332)).

Method Embodiment 1A. The communications method of Method Embodiment 1, wherein the sidelink request response message grants the first UE a channel to use for device to device communications between the first UE and the second UE without requiring a listen before talk (LBT) operation (e.g., where the UE monitors the sidelink communications channel for a period of time before transmitting to the other UE to make sure it is not in use before transmitting) before a UE transmission on the sidelink communications channel.

Method Embodiment 1AA. The communications method of Method Embodiment 1, wherein said granted channel is a GAA channel.

Method Embodiment 1AAA. The communications method of Method Embodiment 1, wherein said granted channel is a PAL channel.

Method Embodiment 2. The communications method of Method Embodiment 1, wherein the sidelink possibility response message (712 or 1030) indicates sidelink communications is allowed and identifies spectrum (e.g., a channel) to be used (and in some embodiments also optionally indicating one or more of: i) SYNC and/or MIB information corresponding to the channel to be used, ii) which of the first and second UEs (330, 332) is to initiate sidelink communication or iii) UE power information such as max transmit power to be used by a UE during the sidelink communication).

Method Embodiment 3. The method of Method Embodiment 2, further comprising: operating the base station (302) to receive (757 which includes steps 758, 764 or 1079 which includes 1080, 1086) one or more detected energy reports indicating energy detected in a communications channel being used by the first and second UEs (330, 332) for sidelink communication; and sending (766 or 1088), from the base station (302), a detected energy report (768 or 1090) to the CNSCC (328) indicating energy detected (e.g., energy detected by the first UE (330) and energy detected by the second UE (332) in the channel being used by the first and second UEs (330, 332) for sidelink communication).

Method Embodiment 4. The method of Method Embodiment 3, further comprising: operating the CNSC (328) to make a channel quality determination (772 or 1094) to determine if the channel being used for sidelink communication is acceptable or is bad (e.g., the CNSCC (328) compares the detected energy values measured by the first and second UEs which are indicative of noise in the channel to an acceptable noise threshold and if the detected noise energy reported by either UE is above the acceptable noise threshold the channel is determined to be to be bad otherwise if the reported energy reported by the UEs is equal to or below the acceptable noise level threshold the channel is determined to be acceptable, i.e., good).

Method Embodiment 5. The method of Method Embodiment 4, wherein the channel quality determination (772) determines (773) that the sidelink channel quality is bad, the method further comprising: operating the CNSCC (328) to send (776) a spectrum inquiry message (778) to an SAS (310) requesting if other spectrum is available to use for UE sidelink communication between the first and second UEs (330, 332); and operating the CNSCC (328) to receive (in 786 if sidelink communications is possible or in step 794 if sidelink communication is not possible) a spectrum inquiry response message (784 or 792) from the SAS (310).

Method Embodiment 6. The method of Method Embodiment 5, wherein the spectrum inquiry response message (784) indicates that additional spectrum which is different from the channel in use for sidelink communications is available; and wherein the method further comprises: operating the CNSCC (328) to send (798) a move sidelink communications message (800) to the base station (302) to control the base station (302) to move the sidelink communications between the first UE (330) and the second UE (332) to the additional spectrum identified by the SAS (310).

Method Embodiment 7. The method of Method Embodiment 5, wherein the spectrum inquiry response message (792) indicates that additional spectrum which is different from the channel in use for sidelink communications is not available; and wherein the method further comprises: operating the CNSCC (328) to send (798) a message (806) to the base station (302) to control the base station (302) to revoke a previous grant for sidelink communications resources to the first UE (330) for communications with the second UE (332).

Method Embodiment 8. The method of Method Embodiment 4, further comprising: determining (1096), at the CNSCC (328), (e.g., based on location information) if sidelink communication is possible between the first UE (330) and the second UE (332) on a second channel which is a cleaner channel that a first channel being used for sidelink communication between the first and second UEs (330, 332).

Method Embodiment 8A. The method of Method Embodiment 8, wherein determining (1096), at the CNSCC (328), (e.g., based on location information) if sidelink communication is possible includes: determining (1128), at the CNSCC (328), that sidelink communication is possible between the first UE (330) and second UE (332) on a second channel which is a cleaner channel than a first channel being used for the sidelink communication between the first and second UEs (330, 332), and wherein the method further comprises: operating the CNSCC (328) to send (1138) an instruction message (1140) to the base station (302) instructing the base station (302) to move the sidelink communications between the first UE (330) and the second UE (332) to the second communications channel.

Method Embodiment 8AA. The method of Method Embodiment 8A, wherein determining (1096), at the CNSCC (328) if sidelink communication is possible between the first UE (330) and second UE (332) on a second channel which is the cleaner channel than the first channel includes: sending (1112) a request to an interference module (312) to determine an area of influence of the first and second UEs and a cleanest PAL or GAA channel available for the sidelink communications between the first UE and second UE.

Method Embodiment 8B. The method of Method Embodiment 8A, wherein determining (1096), at the CNSCC (328) if a sidelink communication is possible between the first UE (330) and second UE (332) on a second channel which is the cleaner channel than the first channel further includes: receiving a response (1122) from the interference module (312) identifying the second channel.

Method Embodiment 9. The method of Method Embodiment 8, further comprising: operating the base station (302) to send (1148) a sidelink switch message (1150) to at least the first UE (330) instructing the first UE (330) to switch sidelink communications between the first UE (330) and second UE (332) from the first channel to the second channel.

NUMBERED LIST OF EXEMPLARY SYSTEM EMBODIMENTS

System Embodiment 1. A communications system (300) comprising: a base station (302 or 1200) including: memory (1210); and a first processor (1202) coupled to said memory (1210), said first processor (1202) configured to operate the base station (302) to: receive (644 of FIG. 6 or 944 of FIG. 7) a sidelink request (642 of FIG. 6 or 942 of FIG. 7) from a first UE (330) for device to device communication between the first UE (330) and a second UE (332); send (684 or 984) a sidelink possibility inquiry message (686 or 986) including information identifying the first and second UEs (and optionally the location of the first and second UEs) to a core network sidelink control component (CNSCC) (328); receive (714 or 1032) a sidelink possibility response message (712 or 1030) from the CNSCC (328); generate (718 or 1036) a sidelink request response message (722 or 1040) based on information included in said sidelink possibility response message (712 or 1030); and send (720 or 1038) the sidelink request response message (722 or 1040) to the first UE (330) (e.g., the UE 330 requesting authorization to proceed with device to device communication with the second UE (332)).

System Embodiment 1A. The communications system (300) of System Embodiment 1, wherein the sidelink request response message grants the first UE a channel to use for device to device communications between the first UE and the second UE without requiring a listen before talk (LBT) operation (e.g., where the UE monitors the sidelink communications channel for a period of time before transmitting to the other UE to make sure it is not in use before transmitting) before a UE transmission on the sidelink communications channel.

System Embodiment 1AA. The communications system of System Embodiment 1, wherein said granted channel is a GAA channel.

System Embodiment 1AAA. The communications system of System Embodiment 1, wherein said granted channel is a PAL channel.

System Embodiment 2. The communications system (300) of System Embodiment 1, wherein the sidelink possibility response message (712 or 1030) indicates sidelink communications is allowed and identifies spectrum (e.g., a channel) to be used (and in some embodiments also optionally indicating one or more of: i) SYNC and/or MIB information corresponding to the channel to be used, ii) which of the first and second UEs (330, 332) is to initiate sidelink communication or iii) UE power information such as max transmit power to be used by a UE during the sidelink communication).

System Embodiment 3. The communications system (300) of System Embodiment 2, wherein said first processor (1202) is further configured to operate the base station (302) to: to receive (757 which includes steps 758, 764 or 1079 which includes 1080, 1086) one or more detected energy reports indicating energy detected in a communications channel being used by the first and second UEs (330, 332) for sidelink communication; and send (766 or 1088), from the base station (302), a detected energy report (768 or 1090) to the CNSCC (328) indicating energy detected (e.g., energy detected by the first UE (330) and energy detected by the second UE (332) in the channel being used by the first and second UEs (330, 332) for sidelink communication).

System Embodiment 4. The communications system (300) of System Embodiment 3, further comprising: a core network sidelink control component (328 or 400) including a second processor (402) configured to: operate the CNSCC (328) to make a channel quality determination (772 or 1094) to determine if the channel being used for sidelink communication is acceptable or is bad (e.g., the CNSCC (328) compares the detected energy values measured by the first and second UEs which are indicative of noise in the channel to an acceptable noise threshold and if the detected noise energy reported by either UE is above the acceptable noise threshold the channel is determined to be to be bad otherwise if the reported energy reported by the UEs is equal to or below the acceptable noise level threshold the channel is determined to be acceptable, i.e., good).

System Embodiment 5. The communications system (300) of System Embodiment 4, wherein the channel quality determination (772) determines (773) that the sidelink channel quality is bad; and wherein said second processor (402) is further configured to: operate the CNSCC (328) to send (776) a spectrum inquiry message (778) to an SAS (310) requesting if other spectrum is available to use for UE sidelink communication between the first and second UEs (330, 332); and operate the CNSCC (328) to receive (in 786 if sidelink communications is possible or in step 794 if sidelink communication is not possible) a spectrum inquiry response message (784 or 792) from the SAS (310).

System Embodiment 6. The communications system (300) of System Embodiment 5, wherein the spectrum inquiry response message (784) indicates that additional spectrum which is different from the channel in use for sidelink communications is available; and wherein the second processor (402) is further configured to: operate the CNSCC (328) to send (798) a move sidelink communications message (800) to the base station (302) to control the base station (302) to move the sidelink communications between the first UE (330) and the second UE (332) to the additional spectrum identified by the SAS (310).

System Embodiment 7. The communications system (300) of System Embodiment 5, wherein the spectrum inquiry response message (792) indicates that additional spectrum which is different from the channel in use for sidelink communications is not available; and wherein the second processor (402) is further configured to: operate the CNSCC (328) to send (798) a message (806) to the base station (302) to control the base station (302) to revoke a previous grant for sidelink communications resources to the first UE (330) for communications with the second UE (332).

System Embodiment 8. The communications system of System Embodiment 4, wherein said second processor (402)

is further configured to: determine (1096), at the CNSCC (328), (e.g., based on location information) if sidelink communication is possible between the first UE (330) and the second UE (332) on a second channel which is a cleaner channel that a first channel being used for sidelink communication between the first and second UEs (330, 332).

System Embodiment 8A. The communications system of System Embodiment 8, wherein determining (1096), at the CNSCC (328), (e.g., based on location information) if sidelink communication is possible includes: determining (1128), at the CNSCC (328), that sidelink communication is possible between the first UE (330) and second UE (332) on a second channel which is a cleaner channel than a first channel being used for the sidelink communication between the first and second UEs (330, 332), and wherein the second processor (402) is further configured to: operate the CNSCC (328) to send (1138) an instruction message (1140) to the base station (302) instructing the base station (302) to move the sidelink communications between the first UE (330) and the second UE (332) to the second communications channel.

System Embodiment 8AA. The communications system (300) of System Embodiment 8A, wherein said second processor (402) is configured to operate the CNSCC (328) to: send (1112) a request to an interference module (312) to determine an area of influence of the first and second UEs and a cleanest PAL or GAA channel available for the sidelink communications between the first UE and second UE, as part of being configured to operate the CNSCC (328) to determine (1096), at the CNSCC (328) if sidelink communication is possible between the first UE (330) and second UE (332) on a second channel which is the cleaner channel than the first channel.

System Embodiment 8B. The communications system (300) of System Embodiment 8A, said second processor (402) is configured to: operate the CNSCC (328) to receive a response (1122) from the interference module (312) identifying the second channel, as part of being configured to operate the CNSCC (328) to determine (1096), at the CNSCC (328) if a sidelink communication is possible between the first UE (330) and second UE (332) on a second channel which is the cleaner channel than the first channel.

System Embodiment 9. The communications system (300) of System Embodiment 8, wherein said first processor (1202) is further configured to: operate the base station (302) to send (1148) a sidelink switch message (1150) to at least the first UE (330) instructing the first UE (330) to switch sidelink communications between the first UE (330) and second UE (332) from the first channel to the second channel.

NUMBERED LIST OF EXEMPLARY NON-TRANSITORY COMPUTER READABLE MEDIUM EMBODIMENTS

Non-Transitory Computer Readable Medium Embodiment 1

A non-transitory computer readable medium (1210) including machine executable instructions, which when executed by a processor (1202) of a base station (302 or 1200) control the base station (302 or 1200) to perform the steps of: receiving (644 of FIG. 6 or 944 of FIG. 7), at the base station (302), a sidelink request (642 of FIG. 6 or 942 of FIG. 7) from a first UE (330) for device to device communication between the first UE (330) and a second UE (332); sending, from the base station, (684 or 984) a sidelink possibility inquiry message (686 or 986) including information identifying the first and second UEs (and optionally the location of the first and second UEs) to a core network sidelink control component (CNSCC) (328); receiving (714 or 1032), at the base station (302), a sidelink possibility response message (712 or 1030) from the CNSCC (328); generating (718 or 1036) a sidelink request response message (722 or 1040) based on information included in said sidelink possibility response message (712 or 1030); and sending (720 or 1038), from the base station (302), the sidelink request response message (722 or 1040) to the first UE (330) (e.g., the UE 330 requesting authorization to proceed with device to device communication with the second UE (332)).

Non-Transitory Computer Readable Medium Embodiment 2

A non-transitory computer readable medium (412) including machine executable instructions, which when executed by a processor (402) of a core network sidelink control component (CNSCC) (328 or 400) control the CNSCC (328) to perform the steps of: operating the CNSCC (328) to make a channel quality determination (772) to determine if the channel being used for sidelink communication is acceptable or is bad (e.g., the CNSCC (328) compares the detected energy values measured by the first and second UEs which are indicative of noise in the channel to an acceptable noise threshold and if the detected noise energy reported by either UE is above the acceptable noise threshold the channel is determined to be to be bad otherwise if the reported energy reported by the UEs is equal to or below the acceptable noise level threshold the channel is determined to be acceptable, i.e., good); and operating the CNSCC (328) to send (776) a spectrum inquiry message (778) to an SAS (310) requesting if other spectrum is available to use for UE sidelink communication between the first and second UEs (330, 332).

The techniques of various embodiments may be implemented using software, hardware and/or a combination of software and hardware. Various embodiments are directed to apparatus, e.g., base stations, user equipment (UE) devices, core network devices including core network sidelink control component (CNSCC) devices, SAS devices, interference module devices, e.g., interference servers, and/or elements. Various embodiments are also directed to methods, e.g., method of controlling and/or operating base stations, access points, user equipment (UE) devices, core network devices including CNSCC devices, SAS devices, interference module devices, wireless devices including various UE devices such as, mobile devices, smartphones, subscriber devices, desktop computers, printers, IPTV, laptops, tablets, network edge devices. Various embodiments are also directed to a machine, e.g., computer, readable medium, e.g., ROM, RAM, CDs, hard discs, etc., which include machine readable instructions for controlling a machine to implement one or more steps of a method, e.g., any one of the methods described herein. The computer readable medium is, e.g., non-transitory computer readable medium. It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., base stations, access points, user equipment (UE) devices, SAS devices, interference module devices, core network devices including CNSCC devices, described herein are implemented using one or more components to perform the steps corresponding to one or more methods. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., user (UE) devices, base stations, access points, core network devices such as a CNSCC device include a processor configured to control the device to perform steps in accordance with one of the methods described herein.

The configuration of the processor may be achieved by using one or more components, e.g., software components, to control processor configuration and/or by including hardware in the processor, e.g., hardware components, to perform the recited steps and/or control processor configuration.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in a base station, an AP, a UE, a SAS, an interference device, a core network sidelink control component device, for example, but could be in other devices as well. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:

receiving, at a base station, a sidelink request from a first user equipment (UE) for device to device communication between the first UE and a second UE;

sending, from the base station, a sidelink possibility inquiry message including information identifying the first and second UEs to a core network sidelink control component (CNSCC);

receiving, at the base station, a sidelink possibility response message from the CNSCC;

generating a sidelink request response message based on information included in said sidelink possibility response message;

sending, from the base station, the sidelink request response message to the first UE;

receiving, at the base station, one or more detected energy reports indicating energy detected in a communications channel being used by the first and second UEs for sidelink communication; and sending, from the base station, a detected energy report to the CNSCC indicating energy detected in the communications channel being used by the first and second UEs for sidelink communication.

2. The communications method of claim 1, wherein the sidelink request response message grants the first UE a channel to use for device to device communications between the first UE and the second UE without requiring a listen before talk (LBT) operation before a UE transmission on the sidelink communications channel.

3. The communications method of claim 1, wherein the sidelink possibility response message indicates sidelink communications is allowed and identifies spectrum to be used.

4. The method of claim 3, wherein the sidelink possibility response message further indicates which of the first and second UEs is to initiate sidelink communication.

5. The method of claim 1, further comprising:

operating the CNSCC to make a channel quality determination to determine if the channel being used for sidelink communication is acceptable or is bad.

6. The method of claim 5, wherein the channel quality determination determines that the sidelink channel quality is bad, the method further comprising:

operating the CNSCC to send a spectrum inquiry message to a spectrum access system (SAS) requesting if other spectrum is available to use for UE sidelink communication between the first and second UEs; and operating the CNSCC to receive a spectrum inquiry response message from the SAS.

7. The method of claim 6, wherein the spectrum inquiry response message indicates that additional spectrum which is different from the channel in use for sidelink communications is available; and wherein the method further comprises:

operating the CNSCC to send a move sidelink communications message to the base station to control the base station to move the sidelink communications between the first UE and the second UE to the additional spectrum identified by the SAS.

8. The method of claim 6, wherein the spectrum inquiry response message indicates that additional spectrum which is different from the channel in use for sidelink communications is not available; and wherein the method further comprises:

operating the CNSCC to send a message to the base station to control the base station to revoke a previous grant for sidelink communications resources to the first UE for communications with the second UE.

9. The method of claim 5, further comprising: determining, at the CNSCC, if sidelink communication is possible between the first UE and the second UE on a second channel which is different from a first channel being used for sidelink communication between the first and second UEs.

10. The method of claim 9, wherein determining, at the CNSCC, if sidelink communication is possible includes:

determining, at the CNSCC, that sidelink communication is possible between the first UE and second UE on the second channel which is different from the first channel being used for the sidelink communication between the first and second UEs, and wherein the method further comprises:

operating the CNSCC to send an instruction message to the base station instructing the base station to move the sidelink communications between the first UE and the second UE to the second communications channel.

11. The method of claim 10, wherein determining, at the CNSCC if sidelink communication is possible between the first UE and second UE on the second channel which is different from the first channel includes:

sending a request to an interference module to determine an area of influence of the first and second UEs and a Priority Access License (PAL) or General Authorized Access (GAA) channel available for the sidelink communications between the first UE and second UE.

12. The method of claim 9, further comprising:

operating the base station to send a sidelink switch message to at least the first UE instructing the first UE to switch sidelink communications between the first UE and second UE from the first channel to the second channel.

13. A communications system comprising:

a base station including:

memory; and a first processor coupled to said memory, said first processor configured to operate the base station to:

receive a sidelink request from a first user equipment (UE) for device to device communication between the first UE and a second UE;

send a sidelink possibility inquiry message including information identifying the first and second UEs to a core network sidelink control component (CNSCC);

receive a sidelink possibility response message from the CNSCC;

generate a sidelink request response message based on information included in said sidelink possibility response message;

send the sidelink request response message to the first UE;

receive one or more detected energy reports indicating energy detected in a communications channel being used by the first and second UEs for sidelink communication; and send a detected energy report to the CNSCC indicating energy detected in the communications channel being used by the first and second UEs for sidelink communication.

14. The communications system of claim 13, wherein the sidelink request response message grants the first UE a channel to use for device to device communications between the first UE and the second UE without requiring a listen before talk (LBT) operation before a UE transmission on the sidelink communications channel.

15. The communications system of claim 13, wherein the sidelink possibility response message indicates sidelink communications is allowed and identifies spectrum to be used.

16. The communications system of claim 15, wherein the sidelink possibility response message further indicates which of the first and second UEs is to initiate sidelink communication.

17. The communications system of claim 16, further comprising:

said CNSCC including a second processor configured to:

operate the CNSCC to make a channel quality determination to determine if the channel being used for sidelink communication is acceptable or is bad.

18. The communications system of claim 17, wherein the channel quality determination determines that the sidelink channel quality is bad; and wherein said second processor is further configured to:

operate the CNSCC to send a spectrum inquiry message to a spectrum access system (SAS) requesting if other spectrum is available to use for UE sidelink communication between the first and second UEs; and operate the CNSCC to receive a spectrum inquiry response message from the SAS.

19. The communications system of claim 18, wherein the spectrum inquiry response message indicates that additional spectrum which is different from the channel in use for sidelink communications is available; and wherein the second processor is further configured to:

operate the CNSCC to send a move sidelink communications message to the base station to control the base station to move the sidelink communications between the first UE and the second UE to the additional spectrum identified by the SAS.

20. A non-transitory computer readable medium including machine executable instructions, which when executed by a processor of a base station, control the base station to perform the steps of:

receiving, at the base station, a sidelink request from a first user equipment (UE) for device to device communication between the first UE and a second UE;

sending, from the base station, a sidelink possibility inquiry message including information identifying the first and second UEs to a core network sidelink control component (CNSCC);

receiving, at the base station, a sidelink possibility response message from the CNSCC;

generating a sidelink request response message based on information included in said sidelink possibility response message;

sending, from the base station, the sidelink request response message to the first UE;

receiving, at the base station, one or more detected energy reports indicating energy detected in a communications channel being used by the first and second UEs for sidelink communication; and sending, from the base station, a detected energy report to the CNSCC indicating energy detected in the communications channel being used by the first and second UEs for sidelink communication.

* * * * *